US011922546B2

(12) United States Patent
David et al.

(10) Patent No.: US 11,922,546 B2
(45) Date of Patent: Mar. 5, 2024

(54) METHODS AND APPARATUS TO GENERATE AND DISPLAY TRENDS ASSOCIATED WITH A PROCESS CONTROL SYSTEM

(71) Applicant: FISHER-ROSEMOUNT SYSTEMS, INC., Round Rock, TX (US)

(72) Inventors: Denis David, Round Rock, TX (US); Monja Lajoie, Austin, TX (US); Jessica Siu Liu, Pflugerville, TX (US); Karen Chau Johnson, Austin, TX (US); Cody Troyer, Austin, TX (US); Ian Nadas, Austin, TX (US); Duane L. Harnish, Salado, TX (US); Simran Ahuja, Leander, TX (US); Amanda McConville, Cedar Park, TX (US); Terry P. Vallery, Jr., Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 17/824,439

(22) Filed: May 25, 2022

(65) Prior Publication Data

US 2023/0386103 A1 Nov. 30, 2023

(51) Int. Cl.
*G06T 11/20* (2006.01)
*G06F 3/0486* (2013.01)

(52) U.S. Cl.
CPC .......... *G06T 11/206* (2013.01); *G06F 3/0486* (2013.01); *G06T 2200/24* (2013.01)

(58) Field of Classification Search
CPC .. G06T 2200/24; G06T 11/206; G06F 3/0486
See application file for complete search history.

(56) References Cited

U.S. PATENT DOCUMENTS

| 7,460,123 | B1 * | 12/2008 | Hull | G06T 11/206 |
| | | | | 345/672 |
| 2011/0029102 | A1 * | 2/2011 | Campney | G05B 17/02 |
| | | | | 700/83 |

(Continued)

OTHER PUBLICATIONS

Access Analytic, "The easiest ways to add a new data series to an existing Excel chart", Mar. 5, 2019, https://web.archive.org/web/20190305213114/https://accessanalytic.com.au/easiest-way-add-data-existing-chart/ (Year: 2019).*

(Continued)

*Primary Examiner* — Michelle L Sams
(74) *Attorney, Agent, or Firm* — Hanley, Flight & Zimmerman, LLC

(57) ABSTRACT

Methods and apparatus to generate and display trends associated with a process control system are disclosed. An example apparatus includes memory, machine readable instructions, and processor circuitry to execute the instructions to generate a first graphical user interface. The first graphical user interface to include a graphical representation of a component in a process control system. The processor circuitry to generate a second graphical user interface. The second graphical user interface to include a chart region with a trend represented therein. The trend indicative of values of a process parameter of the process control system over a period of time. The processor circuitry to automatically generate the trend in the chart region in response to a graphical element being dragged and dropped from the first graphical user interface to the second graphical user interface.

22 Claims, 15 Drawing Sheets

(56) References Cited

U.S. PATENT DOCUMENTS

2016/0070430 A1* 3/2016 Kim .................. G06F 3/04817
 715/769
2017/0168993 A1 6/2017 Prakash et al.
2018/0024901 A1 1/2018 Tankersley et al.

OTHER PUBLICATIONS

Excel 2019 screen shots. (Year: 2019).*
International Searching Authority, "International Search Report and Written Opinion," issued in connection with PCT Application No. PCT/US23/14827, dated Jul. 6, 2023, 15 pages.

* cited by examiner

METHODS AND APPARATUS TO GENERATE AND DISPLAY TRENDS ASSOCIATED WITH A PROCESS CONTROL SYSTEM

FIELD OF THE DISCLOSURE

This disclosure relates generally to process control systems and, more particularly, to methods and apparatus to generate and display trends associated with a process control system.

BACKGROUND

Process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to initiate process control system alarms.

Information from the field devices and/or the controllers is usually made available over a data highway or communication network to one or more other hardware devices, such as operator workstations, personal computers, data historians, report generators, centralized databases, etc. Such devices are typically located in control rooms and/or other locations remotely situated relative to the harsher plant environment. These hardware devices, for example, run applications that enable an operator to perform any of a variety of functions with respect to the process of a process control system, such as viewing the current state of the process, changing an operating state, changing settings of a process control routine, modifying the operation of the process controllers and/or the field devices, etc.

SUMMARY

Methods and apparatus to generate and display trends associated with a process control system are disclosed. An example apparatus includes memory, machine readable instructions, and processor circuitry to execute the instructions to generate a first graphical user interface. The first graphical user interface to include a graphical representation of a component in a process control system. The processor circuitry to generate a second graphical user interface. The second graphical user interface to include a chart region with a trend represented therein. The trend indicative of values of a process parameter of the process control system over a period of time. The processor circuitry to automatically generate the trend in the chart region in response to a graphical element being dragged and dropped from the first graphical user interface to the second graphical user interface.

An example non-transitory machine readable storage medium comprising instructions that, when executed, cause processor circuitry to at least generate a first graphical user interface. The first graphical user interface to include a graphical representation of a component in a process control system. The instructions to cause the processor circuitry to generate a second graphical user interface. The second graphical user interface to include a chart region with a trend represented therein. The trend indicative of values of a process parameter of the process control system over a period of time. The instructions to cause the processor circuitry to automatically generate the trend in the chart region in response to a graphical element being dragged and dropped from the first An example method includes generating a first graphical user interface. The first graphical user interface to include a graphical representation of a component in a process control system. The method further includes generating a second graphical user interface. The second graphical user interface to include a chart region with a trend represented therein. The trend indicative of values of a process parameter of the process control system over a period of time. The method further including automatically generating, by executing an instruction with at least one processor, the trend in the chart region in response to a graphical element being dragged and dropped from the first graphical user interface to the second graphical user interface.

BRIEF DESCRIPTION OF THE DRAWINGS

In general, the same reference numbers will be used throughout the drawing(s) and accompanying written description to refer to the same or like parts. The figures are not necessarily to scale.

Figure 1:
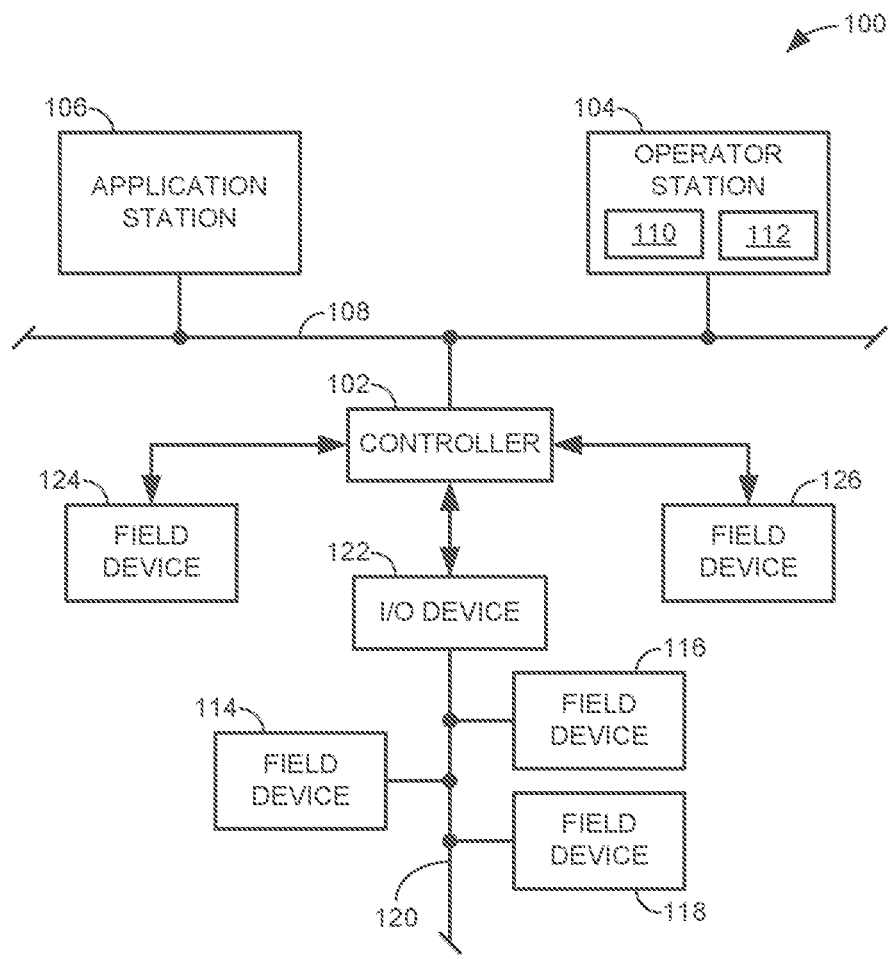
FIG. 1 is a schematic illustration of an example process control system.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Process control system operators often need to monitor multiple operations and/or associated parameters in a control system at any given point in time. Often this is facilitated by operator interface applications implemented on workstations that generate an operator interface that includes a graphical representation of a process control system or parts thereof. Such operator interfaces often include information about current values of process parameters and/or other relevant information that is updated in substantially real-time.

While an operator interface can provide a snapshot of the current state of a process control system, operators may wish to view the trends for certain parameters over time to assess what has happened in the past and/or to anticipate where the operation and/or state of components and/or parameters of the process control system are heading. Some operator interfaces may enable a user (e.g., a plant operator) to view basic trend information, but the information is often fixed in its appearance and format with few options for the operator to interact with the information and/or configure its appearance and/or presentation in a manner that is suitable to address the needs of the operator. Further, trend information provided in operator interfaces is often limited to a particular process parameter such that it can be difficult to compare the values and/or trends of different parameters in a process control system.

The limitations of operator interfaces in providing trend information that meets the needs of operators can be overcome by the implementation of a trend interface application. Such trend interface applications generate a trend interface that includes one or more charts or graphs with lines or plots of trend information associated with one or more process parameters. Trend interfaces can provide more flexibility to an operator (when compared to an operator interface) to configure a graph or chart to show trend information in a manner that is meaningful to the operator. However, such trend interfaces are still limited in their utility and/or cumbersome to configure, particularly when multiple trends associated with multiple different parameters are to be represented at the same time. Furthermore, trend interface applications typically operate independent of operator interface applications such that there is no easy way for an operator to select or identify a parameter and/or component in an operator interface to configure a trend graphic in a trend interface. Rather, any trend to be viewed by an operator in a trend interface would need to be individually configured by the operator independent of what may be configured in the operator interface.

Examples disclosed herein overcome the above issues by enabling the automatic configuration and generation of trend graphics for display in in a trend interface based on the configuration of data associated with an operator interface.

More particularly, in some examples, an operator can select a particular parameter and/or component in an operator interface and drag and drop the particular parameter and/or component to a trend interface to have trend graphics generated in the trend interface for the selected parameter and/or component. Further, examples disclosed herein provide improvements to user interactions with the trend interface to facilitate the configuration and/or adjustment of the appearance and/or display of multiple trends at a single point in time.

FIG. 1 is a schematic illustration of an example process control system 100 implemented in accordance with teachings disclosed herein. The example process control system 100 of FIG. 1 includes one or more process controllers (one of which is designated at reference numeral 102), one or more operator stations (one of which is designated at reference numeral 104), and one or more workstations (one of which is designated at reference numeral 106). The example process controller 102, the example operator station 104 and the example workstation 106 are communicatively coupled via a bus and/or local area network (LAN) 108, which is commonly referred to as an application control network (ACN).

The example operator station 104 of FIG. 1 allows an operator to review and/or operate one or more operator display screens and/or applications that enable the operator to view process control system parameters, states, conditions, alarms, etc., and/or change process control system settings (e.g., set points, operating states, etc.). In this example, the operator station 104 includes and/or implements an example operator interface application 110 and an example trend interface application 112. An example manner of implementing the example operator station 104 of FIG. 1 is described below in connection with FIG. 2. In some examples, the operator station 104 generates and/or implements graphical user interfaces associated with the example operator interface application 110 and the example trend interface application 112. Example graphical user interfaces for the example operator interface application 110 and the example trend interface application 112 are shown and described below in connection with FIGS. 3-8.

The example workstation 106 of FIG. 1 may be configured as an application station to perform one or more information technology applications, user-interactive applications and/or communication applications. For example, the application station may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example workstation 106 of FIG. 1 may be implemented using one or more workstations and/or any other suitable computer systems and/or processing systems. For example, the operator station 104 and/or workstation 106 could be implemented using single processor personal computers, single or multi-processor workstations, etc.

The example LAN 108 of FIG. 1 may be implemented using any desired communication medium and protocol. For example, the LAN 108 may be based on a hardwired and/or wireless Ethernet communication scheme. However, any other suitable communication medium(s) and/or protocol(s) could be used. Further, although a single LAN 108 is illustrated in FIG. 1, more than one LAN and/or other alternative communication hardware may be used to provide redundant communication paths between the example systems of FIG. 1.

The example controller 102 of FIG. 1 is coupled to a plurality of smart field devices 114, 116 and 118 via a digital data bus 120 and an input/output (I/O) gateway 122. The smart field devices 114, 116, and 118 may be Fieldbus compliant valves, actuators, sensors, etc., in which case the smart field devices 114, 116, and 118 communicate via the digital data bus 120 using the well-known Foundation Fieldbus protocol. Of course, other types of smart field devices and communication protocols could be used instead. For example, the smart field devices 114, 116, and 118 could instead be Profibus and/or HART compliant devices that communicate via the data bus 120 using the well-known Profibus and HART communication protocols. Additional I/O devices (similar and/or identical to the I/O gateway 122) may be coupled to the controller 102 to enable additional groups of smart field devices, which may be Foundation Fieldbus devices, HART devices, etc., to communicate with the controller 102.

In addition to the example smart field devices 114, 116, and 118, one or more non-smart field devices 124 and 126 may be communicatively coupled to the example controller 102. The example non-smart field devices 124 and 126 of FIG. 1 may be, for example, conventional 4-20 milliamp (mA) or 0-10 volts direct current (VDC) devices that communicate with the controller 102 via respective hardwired links.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other system operator using the operator station 104 and which have been downloaded to and/or instantiated in the controller 102.

While FIG. 1 illustrates an example process control system 100 within which the methods and apparatus to control information presented to process control system operators and/or other personnel described in greater detail below may be advantageously employed, persons of ordinary skill in the art will readily appreciate that the methods and apparatus to control information presented to operators and/or other personnel described herein may, if desired, be advantageously employed in other process plants and/or process control systems of greater or less complexity (e.g., having more than one controller, across more than one geographic location, etc.) than the illustrated example of FIG. 1.

Figure 2:
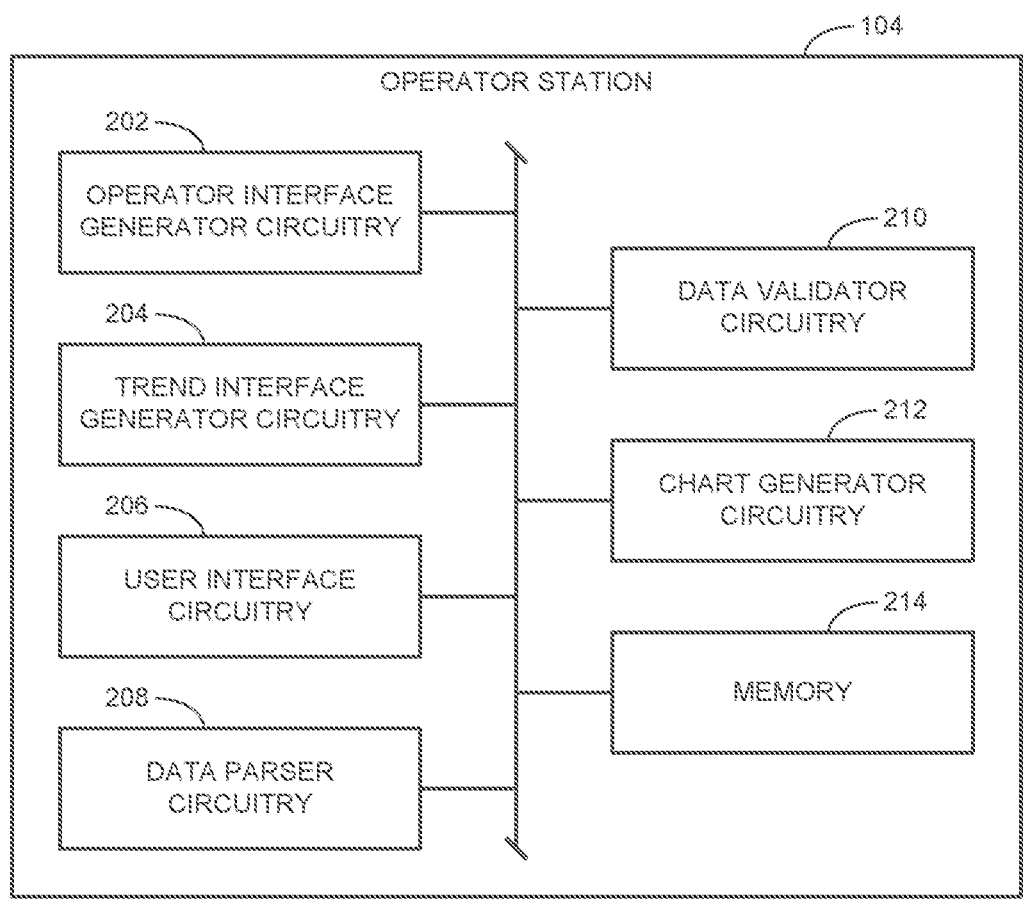
FIG. 2 is a block diagram illustrating an example implementation of the example operator station of FIG. 1

FIG. 2 is a block diagram of the example operator station 104 of FIG. 1 to generate and/or configure trends represented in a chart within a trend interface in an efficient manner. The example operator station 104 of FIG. 2 may be instantiated (e.g., creating an instance of, bring into being for any length of time, materialize, implement, etc.) by processor circuitry such as a central processing unit executing instructions. Additionally or alternatively, the example operator station 104 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

As shown in the illustrated example of FIG. 2, the example operator station 104 includes example operator interface generator circuitry 202, example trend interface generator circuitry 204, example user interface circuitry 206, example data parser circuitry 208, example data validator circuitry 210, example chart generator circuitry 212, and example memory 214. The example operator interface generator circuitry 202 generates, adjusts, and/or updates graphical user interfaces for display (e.g., on a display screen) associated with the operator interface application 110 of FIG. 1. Graphical user interfaces associated with the operator interface application 110 are sometimes referred to herein as operator interfaces. An example operator interface is shown and described below in connection with FIG. 3.

The example trend interface generator circuitry 204 generates, adjusts, and/or updates graphical user interfaces for display (e.g., on a display screen) associated with the trend interface application 112 of FIG. 1. Graphical user interfaces associated with the trend interface application 112 are sometimes referred to herein as trend interfaces. Example trend interfaces are shown and described below in connection with FIGS. 3-8. In some examples, the trend interface circuitry 204 is instantiated by processor circuitry executing trend interface instructions (e.g., instructions associated with the trend interface application 112 of FIG. 1) and/or configured to perform operations such as those represented by the flowcharts of FIGS. 9-11.

The example user interface circuitry 206 enables communication with input devices associated with the operator station 104 to receive user inputs. In some examples, the input devices correspond to any type of device capable of receiving user inputs such as a keyboard, a mouse, a touchpad, a touchscreen, a microphone (e.g., to receive voice commands), etc. Further, in some examples, the user interface circuitry 206 enables communication with an output device (e.g., a display screen) associated with the operator station 104 to provide outputs responsive to the user inputs. In some examples, the user interface circuitry 206 operates in conjunction with the operator interface generator circuitry 202 to enable a user to interact with an operator interface (e.g., the example operator interface 302 of FIG. 3) associated with the operator interface application 110 of FIG. 1. Similarly, in some examples, the user interface circuitry 206 operates in conjunction with the trend interface generator circuitry 204 to enable a user to interact with a trend interface (e.g., the example trend interface 304 of FIGS. 3-8) associated with the trend interface application 112 of FIG. 1.

In some examples, all three of the operator interface generator circuitry 202, the trend interface generator circuitry 204, and the user interface circuitry 206 operate in combination. More particularly, in some examples, the user interface circuitry 206 detects a user selection (e.g., via a mouse click and hold) of a graphical element in an operator interface (generated by the operator interface generator circuitry 202) and detects the selected graphical element being dragged and dropped by the user into a trend interface (generated by the trend interface generator circuitry 204). The detecting of such user actions can cause a chart in the trend interface to be updated to include a plot of trend information associated with the selected graphical element in the operator interface as discussed in further detail below. In some examples, the user interface circuitry 206 is instantiated by processor circuitry executing user interface instructions and/or configured to perform operations such as those represented by the flowcharts of FIGS. 9-11.

In some examples, the user interface circuitry 206 detects when the selected graphical element is dragged into the trend interface to trigger further actions without the selected graphical element being dropped within the trend interface. For instance, in some examples, the detection of a dragging operation associated with a selected graphical element triggers drag data associated the graphical element to be serialized into a text-based string (e.g., a JavaScript Object Notation (JSON) string, an Extensible Markup Language (XML) string, etc.). As used herein, drag data refers to the data that is effectively dragged with a user selected graphical element selected by a user to be dragged and dropped somewhere else. That is, when the graphical element is dropped in a trend interface (or any other application or location) the drag data (e.g., the JSON string) contains all the data that is passed to the trend interface. In some examples, as noted above, the drag data (e.g., the JSON string) is passed to the trend interface in response to the associated graphical element being dragged to the trend interface regardless of whether the selected graphical element is dropped into the trend interface.

The particular contents of the drag data can be configured to include any relevant information to be associated with the graphical element in the operator interface. Often, the drag data is configured by a configuration engineer designing the operator interface before it is deployed and implemented in connection with operation of the process control system 100 of FIG. 1. In some examples, the drag data includes trend information associated with one or more parameters in the process control system 100. In some examples, the one or more parameters correspond to and/or are associated with the operation of particular component(s) graphically represented by the graphical element in the operator interface. However, in some examples, at least one of the one or more parameters is not directly associated with and/or relevant to (e.g., is unrelated to) the operation of the component(s) graphically represented by the graphical element in the operator interface. In other words, drag data can be arbitrarily configured to contain trend information (or other information) associated with any aspect of the process control system 100 regardless of the particular relevance of the information to what the particular graphical element visually represents in the operator interface. More particularly, in some examples, trend information contained within drag data includes identification of a particular module parameter (e.g., Module/Block/Parameter.Field) for which a trend is to be plotted and identification of the historian node and/or database where the parameter is historized and/or archived. Further, in some examples, the trend information in the drag data includes scaling information for the parameter. Additionally or alternatively, in some examples, the trend information in the drag data includes a path to the module parameter that specifies the scaling information (e.g., MOD/PID1/OUT SCALE). In some examples, the trend information in the drag data includes upper and lower (high and low) limits for a Y-axis scale when the trend data for the parameter is plotted in a chart. Further, in some example, the trend information in the drag data defines the units for the parameter as well as the number of significant digits following a decimal point (to define the precision of the parameter values).

The example data parser circuitry 208 of FIG. 2 parses the drag data (e.g., the JSON string) to extract the trend information contained therein. In some examples, the data parser circuitry 208 parses the drag data in response to a graphical element from an operator interface being selected, dragged, and dropped into a trend interface. In other examples, the data parser circuitry 208 parses the drag data as soon as the selected graphical element is dragged into the trend interface before the graphical element is dropped. Initiating the extraction of the trend information as soon as the graphical element is dragged into the trend interface (e.g., without the graphical element being dropped) increases efficiency by enabling subsequent processing of the trend information to be performed before the graphical element is dropped for improved user experience. In some examples, the data parser circuitry 208 is instantiated by processor circuitry executing data parser instructions (e.g., instructions associated with the trend interface application 112 of FIG. 1) and/or configured to perform operations such as those represented by the flowcharts of FIGS. 9-11. In some examples, the data parser circuitry 208 is a third-party parser such as RapidJSON.

The example data validator circuitry 210 analyzes the trend information extracted from the drag data to determine whether the trend information is valid. In some examples, the data validator circuitry 210 determines the trend information is valid when the drag data (e.g., the JSON string) is in a proper format. Additionally or alternatively, the data validator circuitry 210 determines the trend information is valid when the trend information includes a parameter reference to enable the retrieval of the trend data to be plotted in a chart. In some examples, the data validator circuitry 210 is instantiated by processor circuitry executing data validator instructions (e.g., instructions associated with the trend interface application 112 of FIG. 1) and/or configured to perform operations such as those represented by the flowcharts of FIGS. 9-11.

The example chart generator circuitry 212 generates a graph or plot of trend data for one or more parameters associated with the process control system for display within a chart in the trend interface. A graph or plot of trend data is also referred to herein simply as a trend. In some examples, the parameters that serve as the basis for trends represented in a chart in a trend interface are automatically added to the chart by dragging and dropping a graphical element (selected from an operator interface) into the trend interface. That is, in some examples, the graph or plot is automatically generated based on the drag data included with the drag and drop operation of a user. In some examples, the graphical element can be dropped anywhere within the trend interface to trigger the automatic generation of trends in a chart in the interface. In other examples, the trends are added to such a chart when the graphical element is dropped within the chart (but not in an area outside of the chart region). In some examples, the example chart generator circuitry 212 facilitates adjustments to the appearance of trends represented in a chart in response to user input.

In some examples, the chart generator circuitry 212 evaluates trend information contained in drag data to determine whether the trend information satisfies threshold limits on the display of trends within the chart region of the trend interface. That is, in some examples, the trend interface is limited to a threshold number of trends that can be displayed at any given time. In some examples, the threshold number of trends can be any suitable number of trends (e.g., 5, 6, 8, 10, 12, 15, 16, 20, 25, etc.). Additionally or alternatively, in some examples, the trend interface is limited to a threshold number of Y-axes that can be displayed in association with the threshold number of trends at any given time. In some examples, the threshold number of Y-axes can be any suitable number of trends (e.g., 5, 6, 8, 10, 12, 15, 16, 25, etc.). In some examples, the threshold number of Y-axes is less than the threshold number of trends. The thresholds can be different because multiple different trends can be associated with the same Y-axis. If one of the thresholds is not satisfied (e.g., is exceeded), the chart generator circuitry 212 can prevent the trend interface from being updated to include the trends associated with a graphical element a user attempts to drop into the interface. Further, in some such examples, the chart generator circuitry 212 causes a notification or indication to be generated to indicate the creation of the plot or graph of the trend(s) cannot be performed as requested.

In some examples, the chart generator circuitry 212 evaluates the trend information to confirm it satisfies the appropriate threshold(s) before a graphical element is dropped. That is, in some examples, the evaluation of the trend information is triggered following the user interface circuitry 206 detecting the graphical element has been dragged into the trend interface without regard to whether the graphical element has been dropped. Enabling the chart generator circuitry 212 to verify the appropriate threshold(s) are satisfied before the graphical element is dropped can improve efficiency by enabling subsequent processes to occur in preparation for an anticipated drop of the currently dragged graphical element. More particularly, in some examples, in response to the chart generator circuitry 212 determining the appropriate threshold(s) have been satisfied, the chart generator circuitry 212 causes the memory 214 to store the trend information in cache for faster retrieval and/or access in the event the graphical element is dropped into the trend interface. In this manner, the chart generator circuitry 212 is able to generate the plot or graph of the trend more quickly than would otherwise be possible if the trend information needed to be retrieved from a less readily accessible memory. Additionally or alternatively, in some examples, trend data (e.g., the values for the identified parameter over time) identified by the trend information is retrieved from a historian node or database and stored in the memory 214 when the graphical element is dragged into the trend interface (but before the element is dropped) to further increase the efficiency with which the resulting trend is to be generated.

Further detail regarding the implementation of the example chart generator circuitry 212 is provided below in connection with a discussion of the example trend interfaces 304 of FIGS. 3-8. In some examples, the chart generator circuitry 212 is instantiated by processor circuitry executing chart generator instructions (e.g., instructions associated with the trend interface application 112 of FIG. 1) and/or configured to perform operations such as those represented by the flowcharts of FIGS. 9-11. In some examples, some or all of the functions and/or operations performed by the chart generator circuitry 212 are implemented by the trend interface generator circuitry 204. In examples where the functions and/or operations of the chart generator circuitry 212 are implemented by the trend interface generator circuitry 204, the chart generator circuitry 212 can be omitted.

In some examples, the apparatus includes means for generating an operator interface. For example, the means for generating the operator interface may be implemented by the example operator interface generator circuitry 202. In some examples, the operator interface generator circuitry 202 may be instantiated by processor circuitry such as the example processor circuitry 1212 of FIG. 12. For instance, the operator interface generator circuitry 202 may be instantiated by the example microprocessor 1300 of FIG. 13 executing machine executable instructions such as those implemented by at least block 902 of FIG. 9. In some examples, the operator interface generator circuitry 202 may be instantiated by hardware logic circuitry, which may be implemented by an ASIC, XPU, or the FPGA circuitry 1400 of FIG. 14 structured to perform operations corresponding to the machine readable instructions. Additionally or alternatively, the operator interface generator circuitry 202 may be instantiated by any other combination of hardware, software, and/or firmware. For example, the operator interface generator circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating a trend interface. For example, the means for generating the trend interface may be implemented by the example trend interface generator circuitry 204. In some examples, the trend interface generator circuitry 204 may be instantiated by processor circuitry such as the example processor circuitry 1212 of FIG. 12. For instance, the trend interface generator circuitry 204 may be instantiated by the example microprocessor 1300 of FIG. 13 executing machine executable instructions such as those implemented by at least blocks 904, 914 of FIG. 9. In some examples, the trend interface generator circuitry 204 may be instantiated by hardware logic circuitry, which may be implemented by an ASIC, XPU, or the FPGA circuitry 1400 of FIG. 14 structured to perform operations corresponding to the machine readable instructions. Additionally or alternatively, the trend interface generator circuitry 204 may be instantiated by any other combination of hardware, software, and/or firmware. For example, the trend interface generator circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for detecting user input(s) to a device. For example, the means for detecting user input(s) may be implemented by the example user interface circuitry 206. In some examples, the user interface circuitry 206 may be instantiated by processor circuitry such as the example processor circuitry 1212 of FIG. 12. For instance, the user interface circuitry 206 may be instantiated by the example microprocessor 1300 of FIG. 13 executing machine executable instructions such as those implemented by at least blocks 906, 918, 920 of FIG. 9. In some examples, the user interface circuitry 206 may be instantiated by hardware logic circuitry, which may be implemented by an ASIC, XPU, or the FPGA circuitry 1400 of FIG. 14 structured to perform operations corresponding to the machine readable instructions. Additionally or alternatively, the user interface circuitry 206 may be instantiated by any other combination of hardware, software, and/or firmware. For example, the user interface circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for extracting data. For example, the means for extracting may be implemented by the example data parser circuitry 208. In some examples, the data parser circuitry 208 may be instantiated by processor circuitry such as the example processor circuitry 1212 of FIG. 12. For instance, the data parser circuitry 208 may be instantiated by the example microprocessor 1300 of FIG. 13 executing machine executable instructions such as those implemented by at least block 908 of FIG. 9. In some examples, the data parser circuitry 208 may be instantiated by hardware logic circuitry, which may be implemented by an ASIC, XPU, or the FPGA circuitry 1400 of FIG. 14 structured to perform operations corresponding to the machine readable instructions. Additionally or alternatively, the data parser circuitry 208 may be instantiated by any other combination of hardware, software, and/or firmware. For example, the data parser circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for validating data. For example, the means for validating may be implemented by the example data validator circuitry 210. In some examples, the data validator circuitry 210 may be instantiated by processor circuitry such as the example processor circuitry 1212 of FIG. 12. For instance, the data validator circuitry 210 may be instantiated by the example microprocessor 1300 of FIG. 13 executing machine executable instructions such as those implemented by at least block 910 of FIG. 9. In some examples, the data validator circuitry 210 may be instantiated by hardware logic circuitry, which may be implemented by an ASIC, XPU, or the FPGA circuitry 1400 of FIG. 14 structured to perform operations corresponding to the machine readable instructions. Additionally or alternatively, the data validator circuitry 210 may be instantiated by any other combination of hardware, software, and/or firmware. For example, the data validator circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating a trend plotted in a chart. For example, the means for generating a trend may be implemented by the example chart generator circuitry 212. In some examples, the chart generator circuitry 212 may be instantiated by processor circuitry such as the example processor circuitry 1212 of FIG. 12. For instance, the chart generator circuitry 212 may be instantiated by the example microprocessor 1300 of FIG. 13 executing machine executable instructions such as those implemented by at least blocks 912, 914, 924, 926 of FIG. 9, blocks 1002, 1004, 1006, 1008, 1010, 1012, 1014 of FIG. 10, and blocks 1102, 1104, 1106, 1108, 1110, 1112 of FIG. 11. In some examples, the chart generator circuitry 212 may be instantiated by hardware logic circuitry, which may be implemented by an ASIC, XPU, or the FPGA circuitry 1400 of FIG. 14 structured to perform operations corresponding to the machine readable instructions. Additionally or alternatively, the chart generator circuitry 212 may be instantiated by any other combination of hardware, software, and/or firmware. For example, the chart generator circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the example operator station 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example operator interface generator circuitry 202, the example trend interface generator circuitry 204, the example user interface circuitry 206, the example data parser circuitry 208, the example data validator circuitry 210, the example chart generator circuitry 212, the example memory 214, and/or, more generally, the example operator station 104 of FIG. 1, may be implemented by hardware alone or by hardware in combination with software and/or firmware. Thus, for example, any of the example operator interface generator circuitry 202, the example trend interface generator circuitry 204, the example user interface circuitry 206, the example data parser circuitry 208, the example data validator circuitry 210, the example chart generator circuitry 212, the example memory 214, and/or, more generally, the example operator station 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device (s) (PLD(s)), and/or field programmable logic device(s) (FPLD(s)) such as Field Programmable Gate Arrays (FPGAs). Further still, the example operator station 104 of FIG. 1 may include one or more elements, processes, and/or devices in addition to, or instead of, those illustrated in FIG. 2, and/or may include more than one of any or all of the illustrated elements, processes and devices.

Figure 3:
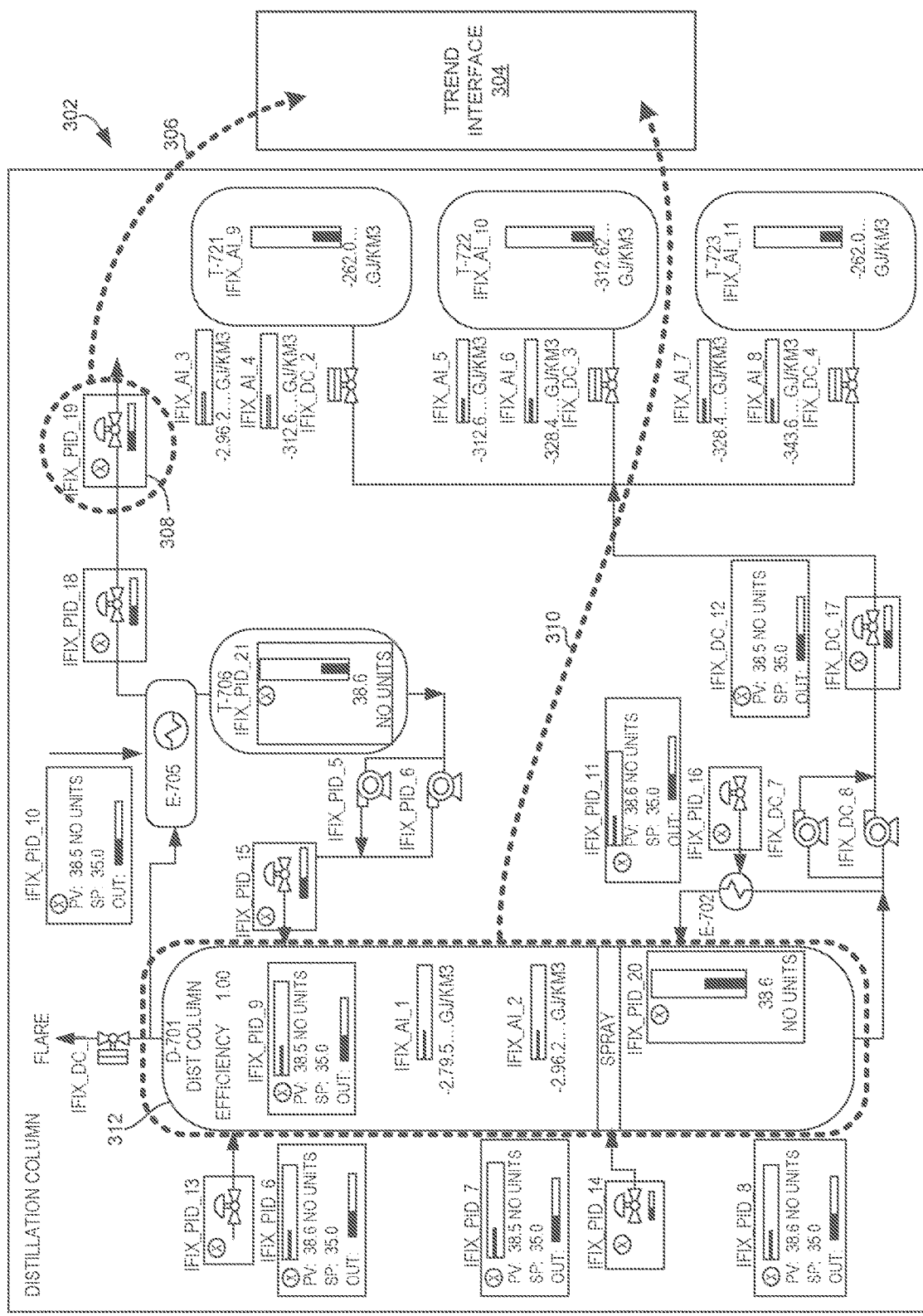
FIG. 3 illustrates an example operator interface associated with the example operator interface application of FIG. 1.
Figure 4:
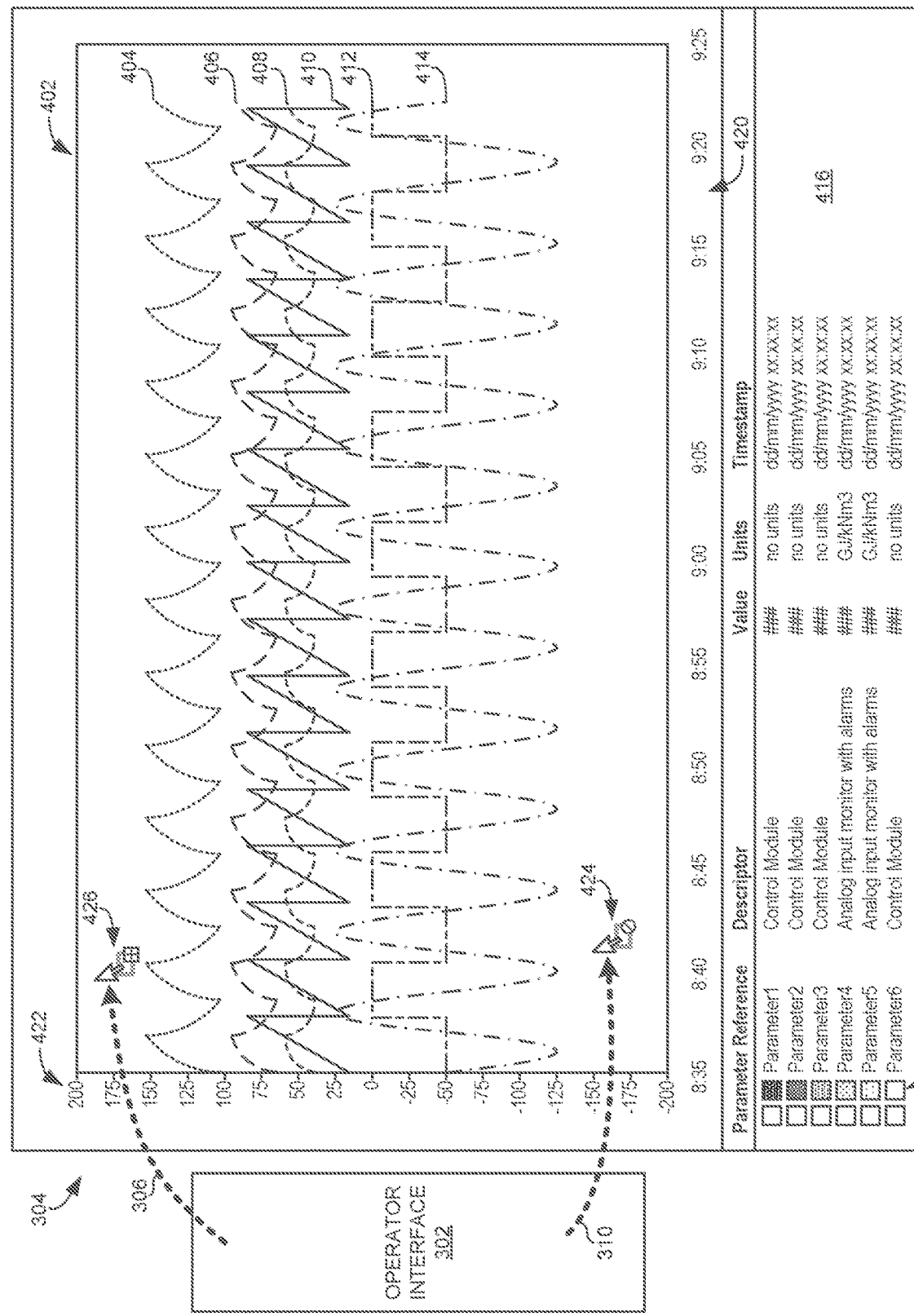
FIG. 4 illustrates an example trend interface associated with the example trend interface application of FIG. 1.

FIG. 3 illustrates an example operator interface 302 adjacent an example trend interface 304 (shown in further detail in FIG. 4). In some examples, the two interfaces 302, 304 are presented alongside one another via a display screen (or multiple display screens) associated with the operator interface. That is, in some examples, the two interfaces 302, 304 are associated with two separate windows associated with two different applications (e.g., the operator interface application 110 and the trend interface application 112) being implemented concurrently on the operator station 104.

As shown in the illustrated example, the operator interface 302 of FIG. 3 includes a process diagram or image of various graphical elements representative of equipment, processes, process variables and/or components, and their relationships within a process control system (e.g., the example process control system 100 of FIG. 1). As used herein, a graphical element corresponding to any visual element or collection of visual elements in the process diagram that can be selected by a user (e.g., an operator). Thus, some graphical elements have a visual appearance that mimics or is based on a real-world structure or object (e.g., a graphical element representative of a distillation column, a tank, a control valve, a pump, etc.). However, some graphical elements may not mimic real-world objects but graphically represent real-world information as text, in some other graphic form (e.g., a bar graph, a sparkline, etc.), or some combination of both. In some examples, a graphical element can include multiple textual and/or visual components that are grouped together for selection by an operator. Whether a particular graphical element capable of selection by an operator includes a single textual and/or visual component or multiple textual and/or visual components is based on how the operator interface was initially configured.

As described above, each individually selectable graphical element in the operator interface 302 (which may or may not correspond to multiple textual and/or visual components) is configured with drag data associated therewith. The drag data enables an operator to select a particular graphical element and drag and drop the graphical element into the trend interface, thereby enabling the drag data to be passed to the trend interface 304. For example, a first drag and drop operation (represented by the arrow 306 in FIG. 3) involves a user selecting a first graphical element 308 corresponding to a PID control loop that is dragged and dropped into the trend interface 304. Further, a second drag and drop operation (represented by the arrow 310 in FIG. 3) involves a user selecting a second graphical element 312 corresponding to a distillation column that is dragged and dropped into the trend interface 304. For purposes of explanation, it is assumed that all textual and visual components within the distillation column are associated with the same graphical element 308 selected for the second drag and drop operation 310. However, in some examples, separate portions of the textual and visual components within the distillation column may correspond to separately selectable graphical elements.

As described above, the drag data associated with each graphical element (e.g., the graphical elements 308, 312) includes trend information defining relevant information to enable the generation of a plot, graph, or trend of trend data for an associated process control parameter. In some examples, the drag data can contain trend information for multiple different parameters. For instance, in this example, the drag data associated with the first graphical element 308 for the PID control loop defines trends for three different parameters including a process parameter value, a set point for the process parameter, and an output. Further, for purposes of explanation, it is assumed that the drag data for the graphical element 312 defines seven different trends.

FIG. 4 illustrates a detailed view of the example trend interface 304 alongside the operator interface 302 (shown in detail in FIG. 3). As shown in the illustrated example, the trend interface 304 includes a chart region 402 containing multiple trends. More particularly, in this example, there are six different trends 404, 406, 408, 410, 412, 414 already included in the chart region 402 (e.g., before the drag and drop operations 306, 310). As shown in FIG. 4, all six trends 404, 406, 408, 410, 412, 414 are associated with a single Y-axis 422 that has lower and upper limits ranging from −200 to +200. In other examples, the Y-axis 422 can have any other scale, which may be configured by the operator. Likewise, all of the trends 404, 406, 408, 410, 412, 414 all share a common X-axis 420. In this example, the X-axis corresponds to a period of time. In some examples, the period of time corresponds to a most recent period of time. That is, in some examples, the trends 404, 406, 408, 410, 412, 414 are updated in substantially real-time such that the X-axis corresponds to a rolling window that progresses with the advancement of time so that the current (e.g., most recent) value for the parameters associated with the trends 404, 406, 408, 410, 412, 414 are displayed within the chart region 402 of the trend interface 304. In some examples, at least some of the parameter values prior to the current (e.g., most recent) value are retrieved from a historian database or other historical archive of process values. In such examples, the current values for the process parameters (and future values as time advances) are obtained in substantially real-time directly from a runtime subsystem of the process control system 100 of FIG. 1. Additionally or alternatively, in some examples, at least some of the parameter values prior to the current (e.g., most recent) value are obtained from the runtime subsystem at a previous point in time when the prior values were the current (e.g., most recent) values without accessing a historical database. That is, in some examples, the trends can be generated within the trend interface 304 on an ongoing basis in substantially real-time to produce a trend that extends backwards in time from a current (present) point in time to the point in time when the trend began being plotted within the trend interface 304 based on the substantially real-time data obtained directly from the process control system independent of a data historian. In other examples, the X-axis can be a period of time in the past that is temporally separated from a current (present) point in time. In some such examples, such trends are generated entirely based on trend data retrieved from a historical database without reference to the current (e.g., substantially real-time) values of the process parameters. In some examples, the length of the time period associated with the X-axis 420 can be adjusted to any suitable period of time (e.g., 10 seconds, 30 second, 1 minute, 5 minutes, 15 minutes, 1 hour, 8 hours, 1 day, etc.).

In some examples, the chart region 402 can include other types of charts or plots of information in addition to or instead of process values plotted against time. For instance, in some examples, textual data (e.g., the "ON" or "OFF" state of a pump) can be plotted or otherwise represented in the chart region 402. Additionally or alternatively, event data (e.g., alarms, manual control actions, process state changes) associated with the trends and/or corresponding parameters can be provided within the chart region 402.

In addition to the chart region 402, the example trend interface 304 includes a legend region 416 that provides a listing of the parameters associated with the trends 404, 406, 408, 410, 412, 414 represented in the chart region 402 along with specific information relevant to each of the parameters. In some examples, the legend region 416 includes color indicators 418 that match the different colors used to generate each of the trends 404, 406, 408, 410, 412, 414 (in the illustrated example different patterns of broken lines and different shading of the color indicators are shown in lieu of different colors). In some examples, an individual row in the legend region 416 (associated with a particular parameter) can be selected and the corresponding trend 404, 406, 408, 410, 412, 414 in the chart region 402 changes appearance (e.g., the line will become highlighted or increase in weight). In some examples, multiple different lines in the legend region can be selected to highlight multiple different corresponding ones of the trends 404, 406, 408, 410, 412, 414 in the chart region 402.

In this example, there is a threshold number of ten trends that can be represented in the chart region 402. Thus, with six trends 404, 406, 408, 410, 412, 414 already included in the chart region 402, a maximum of four more trends can be added. As a result, it would not be possible to drag and drop the second graphical element 312 of FIG. 3 into the trend interface 304 of FIG. 4 because, as noted above, the second graphical element 312 is associated with drag data defining seven different trends. As a result, in this example, a pointer 424 within the trend interface 304 associated with the second drag and drop operation includes an indication (e.g., a prohibition symbol) to represent the drop action is disabled. By contrast, a pointer 426 associated with the first drag and drop operation 306 has a different appearance to indicate it is possible to drop the first graphical element 308 because the drag data associated with that element defines only three trends.

Figure 5:
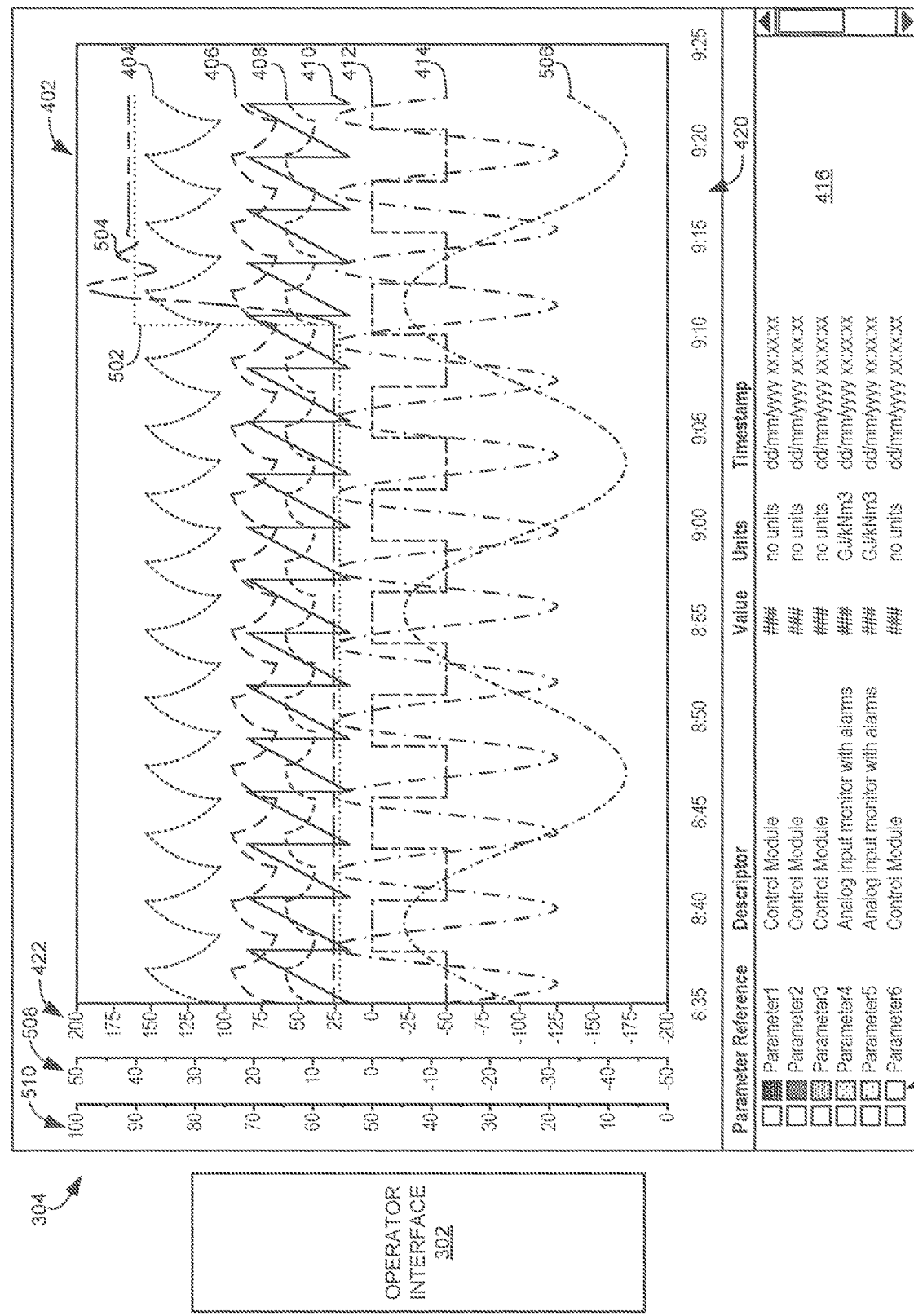
FIG. 5 illustrates the example trend interface of FIG. 4 after the dropping of the first graphical element dragged from the operator interface of FIG. 3.

FIG. 5 illustrates the example trend interface 304 of FIG. 4 after dropping the first graphical element 308 dragged from the operator interface 302 shown in FIG. 3. Thus, as shown in the illustrated example, the chart region 402 includes three additional trends 502, 504, 506 corresponding to the parameters associated with the first graphical element 308. In some examples, the additional trends 502, 504, 506 are automatically generated and scaled by the example chart generator circuitry 212 of FIG. 2 based on the trend information contained in the drag data extracted by the example data parser circuitry 208.

As described above, in some examples, the trend information included in the drag data defines the scaling and lower and upper limits for the Y-axis for each trend. In some examples, the chart generator circuitry 212 compares the Y-axis scaling for different trends to determine whether to group different trends so as to use a common Y-axis. That is, in some examples, if a difference between the Y-axis scale for two trends satisfies (e.g., is less than or equal to) a threshold, the chart generator circuitry 212 uses the same Y-axis scale. In some examples, the threshold is 0 such that the chart generator circuitry 212 groups trends together to share a common Y-axis only when the scaling information for each trend in the group match one another. The first and second trends 502, 504 added in FIG. 5 have a common Y-axis scale that ranges from −50 and +50 while the third trend 504 added in FIG. 5 has a Y-axis scale that ranges from 0 and 100. Inasmuch as these Y-axis scales are different from one another and different than the scale of the Y-axis 422 used for the original six trends 404, 406, 408, 410, 412, 414 in the chart region 402, the chart generator circuitry 212 updates the chart region 402 to include two additional Y-axes 508, 510. As shown in FIG. 5, the second Y-axis has lower and upper limits (e.g., −50 to +50) corresponding to those defined by the trend information associated with the first and second trends 502, 504 added to the chart region 402 in FIG. 5. The third Y-Axis has lower and upper limits (e.g., to 100) corresponding to those defined by the trend information associated with the third trend 506 added to the chart region 402 in FIG. 5.

In some examples, the different Y-axes 422, 508, 510 have different colors that match corresponding colors of one or more of the trends 404, 406, 408, 410, 412, 414, 502, 504, 506 associated therewith. Further, in some examples, the trends 404, 406, 408, 410, 412, 414, 502, 504, 506 are associated with a corresponding one of the Y-axes 422, 508, 510 such that user interactions with one of the Y-axes 422, 508, 510 results in automatic changes to the associated trends 404, 406, 408, 410, 412, 414, 502, 504, 506. For example, if an operator were to click on the second Y-axis 508 and drag it downward, the upper and lower limits on the Y-axis scale would correspondingly increase and both the first and second additional trends 502, 504 (associated with the second Y-axis 508) would shift downwards accordingly. Likewise, if an operator changes the scale of the second Y-axis 508 to range from 0 to 50, the trends 502, 504 would correspondingly increase to be consistent with the new scale. In some examples, user interaction with a particular trend 404, 406, 408, 410, 412, 414, 502, 504, 506 automatically affects corresponding changes to the associated Y-axes 422, 508, 510 and all other trends associated with the corresponding Y-axis. For example, if an operator clicks and drags the first additional trend 502 downward, both the second Y-axis 508 and the second additional trend 504 shift down accordingly. However, the above-user-interactions with the second Y-axis 508 and/or first and second additional trends 502, 504 do not affect the appearance of the other Y-axes 422, 510 or the other trends 404, 406, 408, 410, 412, 414, 506.

Figure 6:
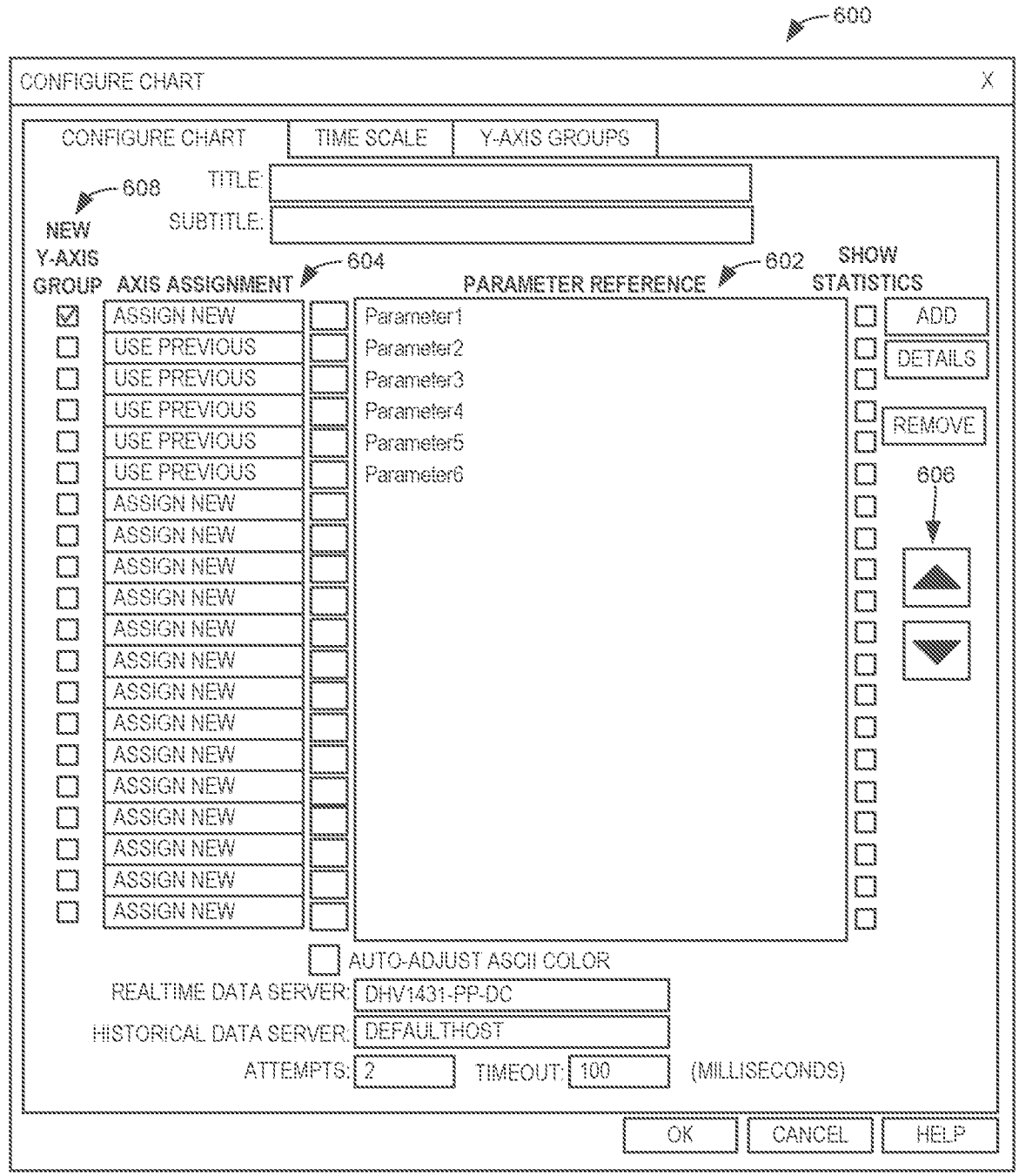
FIG. 6 illustrates an example chart configuration interface associated with the example trend interface of FIGS. 4 and 5.

As indicated above, in some examples, the grouping of trends together to use a common Y-axis is determined automatically (e.g., without operator input) by the chart generator circuitry 212 when a graphical element is dragged and dropped into the trend interface 304. Additionally or alternatively, the grouping of trends to be associated with the same Y-axis can be configured by an operator through an example chart configuration interface 600 as shown in FIG. 6. In some examples, the chart configuration interface 600 is associated with the trend interface application 112 of FIG. 2 and is accessible from within the trend interface 304. In some examples, the graphical elements from the operator interface 302 can be dragged and dropped directly into the chart configuration interface 600 to enable an operator to make adjustments to the automatic configuration before the trends are generated within the chart region 402.

As shown in the illustrated example, the chart configuration interface 600 includes a listing 602 of each parameter associated with each trend plotted within the chart region 402. In this example, the chart configuration interface 600 includes an "Axis Assignment" column 604 that enables an operator to designate whether each parameter is associated with a new Y-axis or associated with a previous Y-axis. When a particular parameter is configured to be associated with a new Y-axis, the Y-axis scaling information configured for the parameter is accessed to define a Y-axis in the chart region 402. When a particular parameter is configured to be associated with a previous Y-axis, the parameter (and associated trend) is grouped with the closest preceding parameter in the listing 602 that is configured to be associated with a new Y-axis. Accordingly, in some examples, the ordering of the parameters is adjustable using order adjustment buttons 606. Additionally or alternatively, in some examples, the ordering of the parameters in the list can be adjusted by an operator interacting with the listing in the legend region 416 shown in FIG. 4.

In some examples, as noted above, there is a threshold number of Y-axes that can be used at any given point in time to ensure there is adequate space within the chart region 402 for the trends. Accordingly, in some examples, the chart generator circuitry 212 determines whether the threshold number of Y-axes is satisfied or if the user input would violate (e.g., exceed) the threshold.

Figure 7:
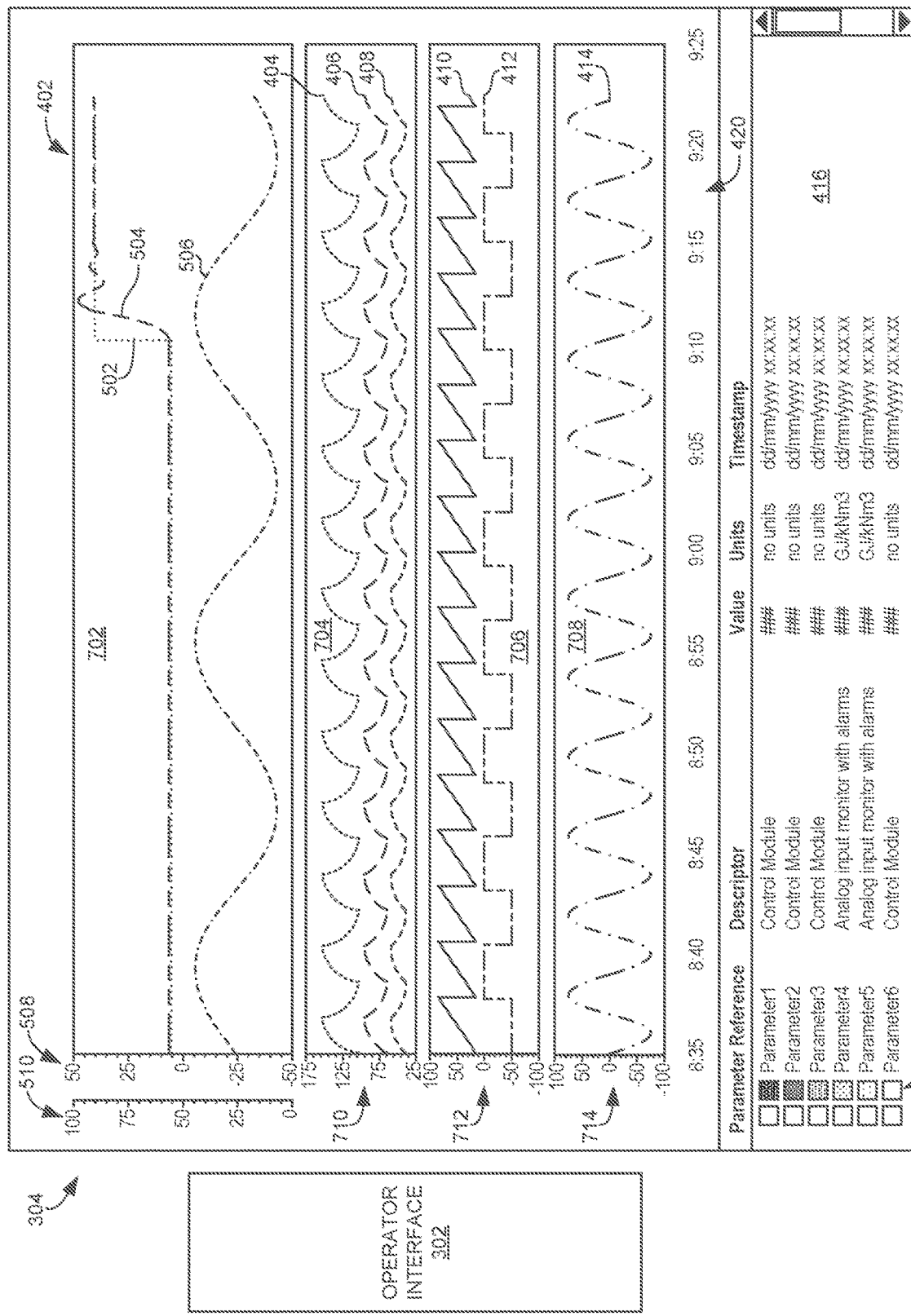
FIG. 7 illustrates the example trend interface of FIG. 5 with the chart region divided into four chart segments.

In some examples, although using multiple different Y-axes can help an operator understand the trends in the chart region 402, presenting multiple trends within a single chart can nevertheless be confusing, particularly as the number of trends increases. Accordingly, in some examples, the chart generator circuitry 212 divides the chart region 402 into multiple distinct chart segments and plots different ones of the trends in the different chart segments. FIG. 7 illustrates the example trend interface 304 with the chart region 402 divided into four chart segments 702, 704, 706, 708. In this example, the first chart segment 702 includes the three additional trends 502, 504, 506 added through the drag and drop operation 306, the second chart segment 704 includes the first three original trends 404, 406, 408, the third chart segment 706 includes the fourth and fifth original trends 410, 412, and the fourth chart segment 708 includes the sixth original trend 414.

As shown in the illustrated example of FIG. 7, each of the chart segments 702, 704, 706, 708 includes at least one Y-axis, but may include more than one. In particular, the first chart segment 702 includes the two Y-axes 508, 510 associated with the three additional trends 502, 504, 506 shown and described in connection with FIG. 5. In this example, the Y-axes 710, 712, 714 associated with each of the other chart segments 704, 706, 708 have been updated with a different scale than the Y-axes 422 shown in FIGS. 4 and In some examples, the updated Y-axes 710, 712, 714 are determined automatically by the chart generator circuitry 212 based on trend information associated with the particular trends 404, 406, 408, 410, 412, 414 included in each of the chart segments 704, 706, 708. In other examples, the original Y-axis 422 is retained for each of the last three chart segments 704, 706, 708 when the chart generator circuitry 212 initially divides the chart region 402 into multiple segments 702, 704, 706, 708. In some such examples, the change to the updated Y-axes 710, 712, 714 is defined by user input. In some examples, a user can provide specific (e.g., custom) labels or titles to different ones of the chart segments to facilitate the ability to understand the trend (or multiple trends) associated with each chart segment. Additionally or alternatively, in some examples, a user can provide specific (e.g., custom) labels or titles for different ones of the Y-axis to facilitate the ability to understand the trend (or multiple trends) associated with the corresponding Y-axis.

In some examples, trends are separated into different chart segments automatically by the chart generator circuitry 212. In other examples, the separation of the chart region 402 into multiple segments is defined by user input. More particularly, in some examples, an operator designates a separate chart segment by selecting the corresponding "New Y-Axis Group" box 608 in the chart configuration interface 600 of FIG. 6. Additionally or alternatively, in some examples, an operator can select multiple trends represented in the chart region 402 of FIG. 4 (and/or the corresponding parameters in the legend region 416) and indicate the selected trends are to be placed into a new group associated with a new chart segment. In some examples, an operator can change the order of the chart segments 702, 704, 706, 708 within the chart region 402 by clicking and dragging a particular chart segment to a particular location above, below, or between other chart segments.

Figure 8:
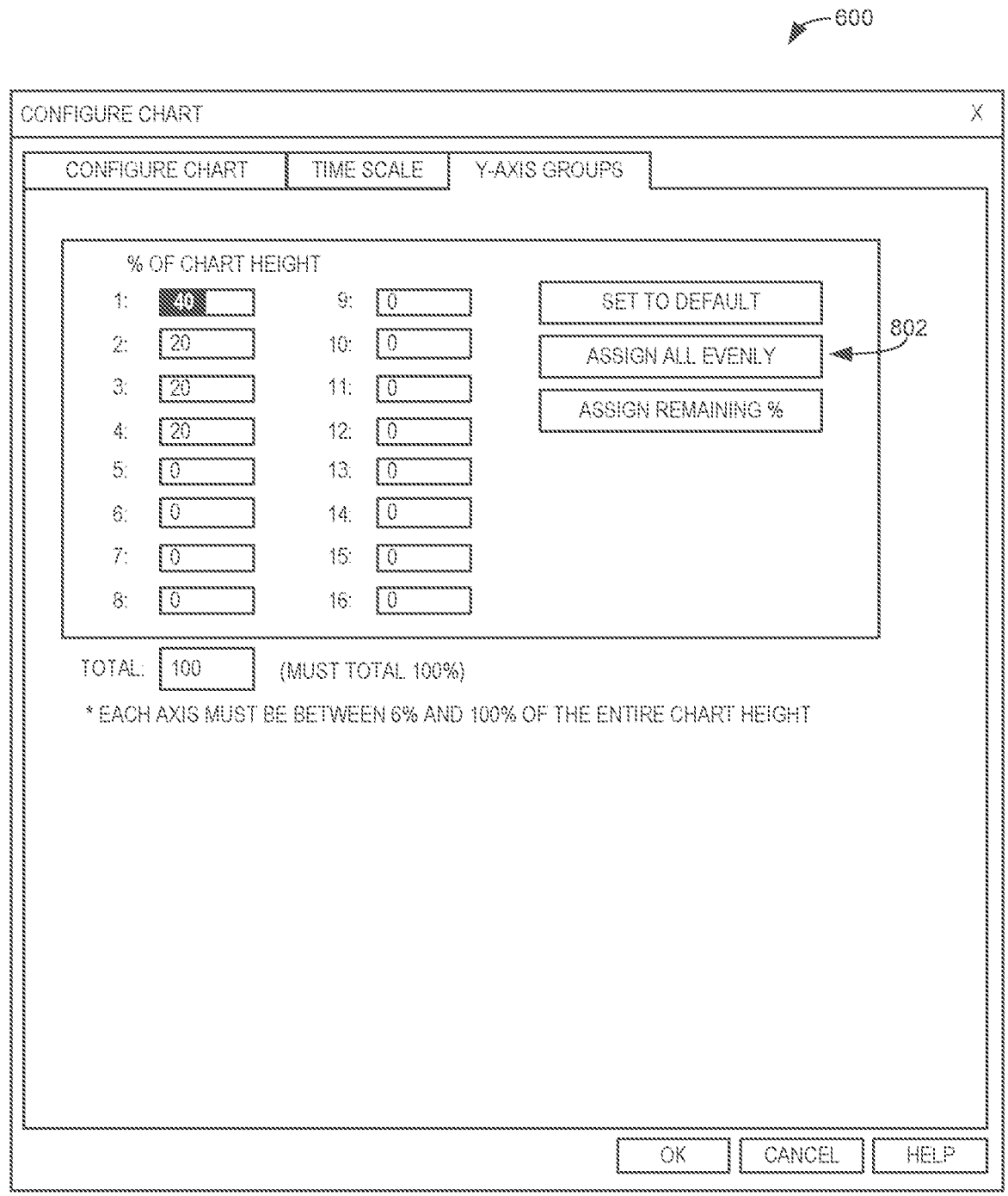
FIG. 8 illustrates a different tab within the example chart configuration interface of FIG. 6.

In some examples, as shown in FIG. 7, the chart segments 702, 704, 706, 708 can be different sizes (e.g., different dimensions in the vertical or Y-axis direction). More particularly, in this example, the bottom three chart segments 704, 706, 708 are the same size as each other and half the size of the first chart segment 702. In some examples, the size (e.g., height) of each segment 702, 704, 706, 708 is configured or selected by an operator identifying a proportion or percentage of the total height of the chart region 402 to be designated for each chart segment (e.g., 40% for the first chart segment 702 and 20% for each of the other chart segments 704, 706, 708 in this example). FIG. 8 illustrates a different tab within the example chart configuration interface 600 of FIG. 6 that enables an operator to specify such proportions or percentages. When there are a large number of chart segments (e.g., up to 16 in the illustrated example of FIG. 8), it can be difficult for an operator to calculate suitable percentages of the height of the chart region 402 to total to 100 percent. Accordingly, in some examples, a button 802 is provided to assign the height evenly between all chart segments designated (e.g., based on the number of boxes 608 checked in FIG. 6). In some examples, the button 802 defines the same height for each chart segment regardless of any numbers already filled out in FIG. 8. In other examples, an operator can specify the height of one or more of the chart segments and the button 802 then automatically defines the same height for all remaining chart segments that do not already have an assigned height. For instance, in this example, the operator defines the first chart segment 702 to correspond to 40% of the total height of the chart region 402. Then, rather than specifying 20% for each of the remaining three chart segments 704, 706, 708, in some examples, the chart generator circuitry 212 automatically determines the equal proportion of 20% of the total height in response to the operator clicking on the button 802.

In some examples, once the appearance of the trend interface 304 is configured as desired by an operator (e.g., all trends to be plotted are included in the chart region 402, the trends are associated with one or more corresponding Y-axes that are suitably scaled, the trends are grouped and presented in suitable chart segments, and the chart segments (if more than one) are defined with suitable heights), the operator can save the configuration to the example memory 214 for subsequent retrieval and use at a later point in time.

Figure 9:
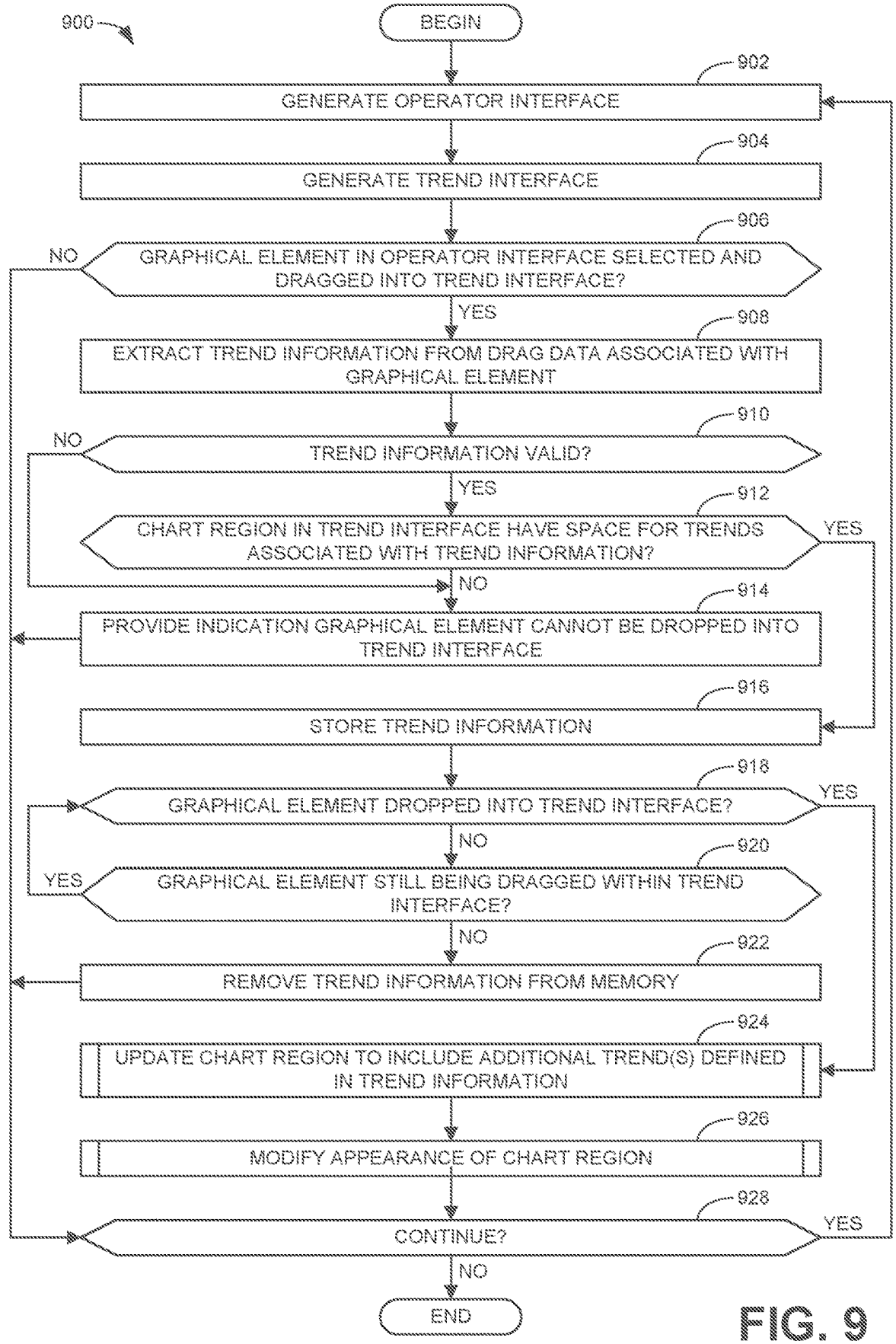
FIGS. 9-11 are flowcharts representative of example machine readable instructions and/or example operations that may be executed by example processor circuitry to implement the example operator station of FIGS. 1 and/or 2.
Figure 10:
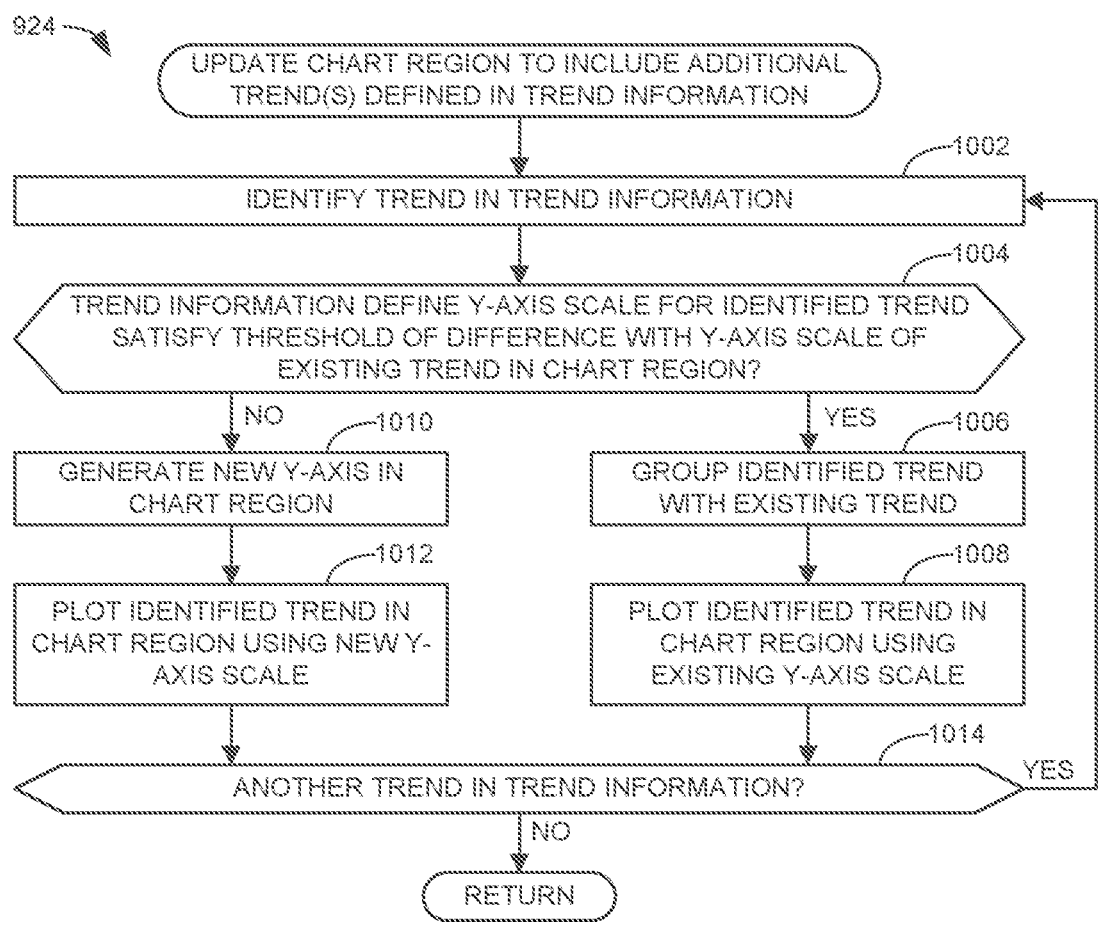
Figure 11:
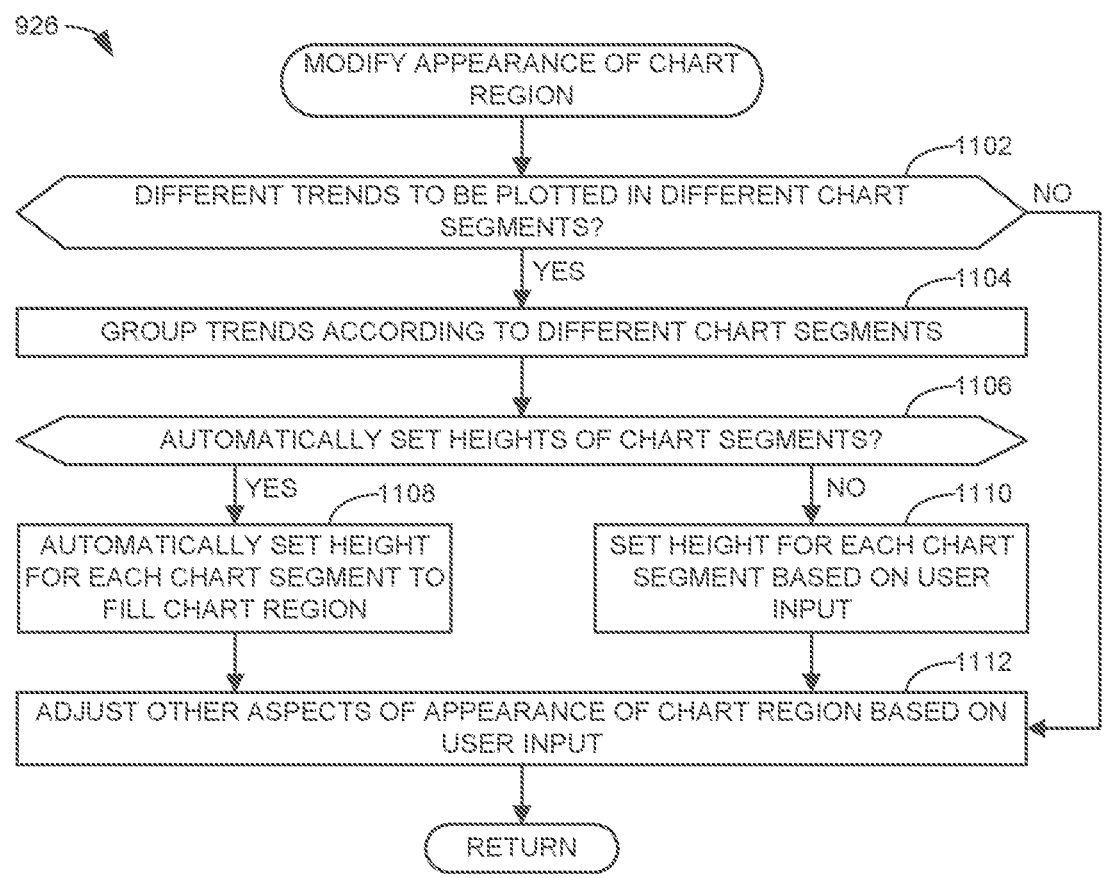

A flowchart representative of example machine readable instructions, which may be executed to configure processor circuitry to implement the operator station 104 of FIGS. 1 and/or 2, is shown in FIGS. 9-11. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 9-11, many other methods of implementing the example operator station 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9-11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by processor circuitry to generate and/or enable configuration or adjustments to the appearance of the trends within the chart region 402 of the trend interface 304 of FIG. 4. The machine readable instructions and/or the operations 900 of FIG. 9 begin at block 902, at which the example operator interface generator circuitry 202 generates an operator interface (e.g., the operator interface 302 of FIG. 3). At block 904, the example trend interface generator circuitry 204 generates a trend interface (e.g., the trend interface 304 of FIGS. 3-8).

At block 906, the example user interface circuitry 206 determines whether a graphical element (e.g., the graphical elements 308, 312 of FIG. 3) in the operator interface 302 has been selected and dragged into the trend interface 304. If not, control advances to block 928. If, on the other hand, a graphical element has been selected and dragged into the trend interface 304, control advances to block 908. As part of the selecting and dragging operation of the graphical element, drag data associated with the graphical element is serialized into a text-based string. Accordingly, at block 908, the example data parser circuitry 208 extracts trend information.

At block 910, the example data validator circuitry 210 determines whether the trend information is valid. In some examples, the trend information is valid if it is in a proper format and each trend identified in the trend information has a corresponding parameter reference. If the trend information is valid, control advances to block 912 where the example chart generator circuitry 212 determines whether a chart region (e.g., the chart region 402 in FIG. 4) in the trend interface 304 has space for the trends associated with the trend information. In some examples, this determination is based on whether the number of trends already in the chart region 402 plus the number of additional trends to be added that are associated with the selected graphically element satisfy (e.g., are less than or equal to) a threshold number of trends. Additionally or alternatively, the determination of whether there is space to add the trends is based on whether the number of Y-axis already in the chart region 402 plus the number of additional Y-axes to be added that are associated with the selected graphical element satisfy (e.g., are less than or equal to) a threshold number of Y-axes. If there is not space for the additional trends, control advances to block 914, where the trend interface generator circuitry 204 provides an indication that the graphical element cannot be dropped into the trend interface 304. Thereafter, control advances to block 928. Returning to block 912, if the chart region 402 has space for the additional trends, control advances to block 916.

At block 916, the example memory 214 stores the trend information. In some examples, the memory 214 in this instance is cache memory to enable efficient access and/or retrieval of the trend information if the graphical element is ultimately dropped in the trend interface 304. At block 918, the example user interface circuitry 206 determines whether the graphical element is dropped into the trend interface 304. If not, control advances to block 920 where the example user interface circuitry 206 determines whether the graphical element is still being dragged within the trend interface 304. If so, control returns to block 918. Otherwise, control advances to block 922 where the example memory 214 clears or removes the trend information. Thereafter, control advances to block 928.

Returning to block 918, if the example user interface circuitry 206 determines that the graphical element is dropped into the trend interface 304, control advances to block 924 where the example chart generator circuitry 212 updates the chart region 402 to include the trend(s) defined in the trend information. Further detail regarding the implementation of block 924 is provided further below in connection with FIG. 10. At block 926, the example chart generator circuitry 212 modifies the appearance of segments of the chart region 402. Further detail regarding the implementation of block 926 is provided further below in connection with FIG. 11. After the chart region 402 is updated (block 924) and modified (block 926) control advances to block 928 where the operator station 104 determines whether to continue. If so, control returns to block 902. Otherwise, the example process of FIG. 9 ends.

FIG. 10 is a flowchart representative of example machine readable instructions and/or example operations that may be executed and/or instantiated by processor circuitry to implement block 924 of FIG. 9. The machine readable instructions and/or the operations of FIG. 10 begin at block 1002, where the example chart generator circuitry 212 identifies a trend in the trend information. At block 1004, the example chart generator circuitry 212 determines whether the trend information defines a Y-axis scale for the identified trend that satisfies a threshold of difference with a Y-axis scale of an existing trend in the chart region 402. In some examples, the threshold is zero such that the Y-axis scale defined in the trend information needs to match the existing Y-axis scale to satisfy the threshold. If the threshold is satisfied, control advances to block 1006 where the example chart generator circuitry 212 groups the identified trend with the existing trend. Thereafter, at block 1008, the example chart generator circuitry 212 plots the identified trend in the chart region using the existing Y-axis scale. Control then advances to block 1014.

Returning to block 1004, if the example chart generator circuitry 212 determines that the Y-axis scale defined for the identified trend does not satisfy the threshold of difference, control advances to block 1010. At block 1010, the example chart generator circuitry 212 generates a new Y-axis in the chart region 402. Then, at block 1012, the example chart generator circuitry 212 plots the identified trend in the chart region using the new Y-axis scale. Thereafter, control advances to block 1014. At block 1014, the example chart generator circuitry 212 determines whether there is another trend in the trend information. If so, control returns to block 1002 to repeat the process. Otherwise, the example process of FIG. 10 ends and returns to complete the process of FIG. 9.

FIG. 11 is a flowchart representative of example machine readable instructions and/or example operations that may be executed and/or instantiated by processor circuitry to implement block 926 of FIG. 9. The machine readable instructions and/or the operations of FIG. 11 begin at block 1102, where the example chart generator circuitry 212 determines whether different trends in the chart region 402 are to be plotted within different chart segments (e.g., the chart segments 702, 704, 706, 708 of FIG. 7). If so, control advances to block 1104 where the example chart generator circuitry 212 groups trends according to the different chart segments 702, 704, 706, 708. In some examples, this grouping of the trends is based on user input. In other examples, this grouping is accomplished automatically. At block 1106, the example chart generator circuitry 212 determines whether to automatically set the heights for the chart segments 702, 704, 706, 708. If so, control advances to block 1108 where the example chart generator circuitry 212 automatically sets the height for each chart segment to fill the chart region 402. Thereafter, control advances to block 1112.

Returning to block 1106, if the heights are not to be automatically set, control advances to block 1110 where the example chart generator circuitry 212 sets the height for each chart based on user input. Thereafter, control advances to block 1112. Returning to block 1102, if the trends are not to be plotted in different chart segments, control advances directly to block 1112. At block 1112, the example chart generator circuitry 212 adjusts other aspects of the appearance of the chart region 402 based on user input. Such adjustments to the appearance correspond to any manner in which the chart region 402 can be configured by a user. For instance, such adjustments include changes to the Y-axes scales, changes to the X-axes scales, reorder of the chart segments 702, 704, 706, 708, reordering of trends, labeling of the axes and/or chart segments, etc. After any adjustments based on user input are made, the example process of FIG. 11 ends and returns to complete the process of FIG. 9.

Figure 12:
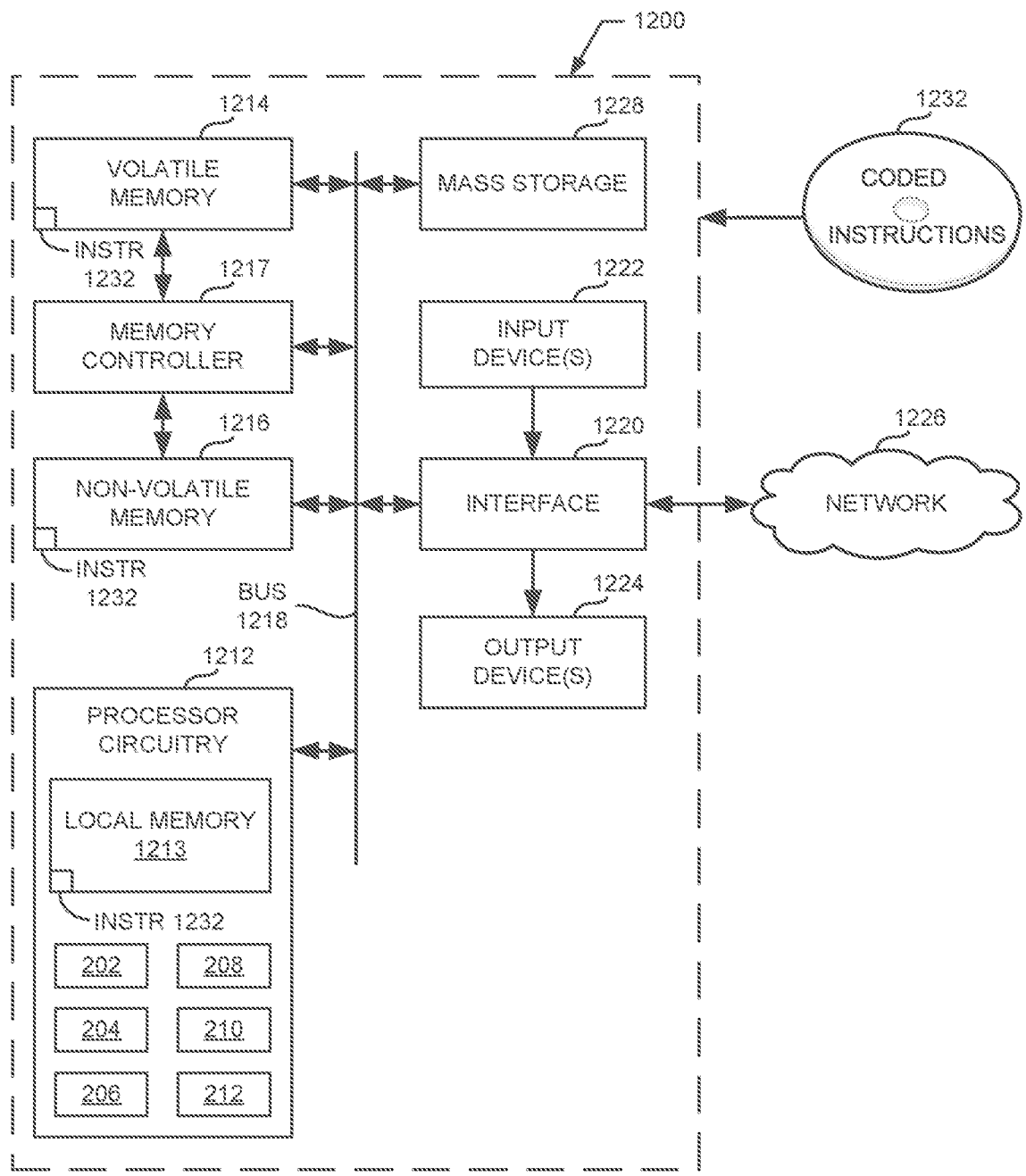
FIG. 12 is a block diagram of an example processing platform including processor circuitry structured to execute the example machine readable instructions and/or the example operations of FIGS. 9-11 to implement the example operator station of FIGS. 1 and/or 2.

FIG. 12 is a block diagram of an example processor platform 1200 structured to execute and/or instantiate the machine readable instructions and/or the operations of FIGS. 9-11 to implement the operator station 104 of FIGS. 1 and/or 2. The processor platform 1200 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example operator interface generator circuitry 202, the example trend interface generator circuitry 204, the example user interface circuitry 206, the example data parser circuitry 208, the example data validator circuitry 210, and the example chart generator circuitry 212

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1232, which may be implemented by the machine readable instructions of FIGS. 9-11, may be stored in the mass storage device 1228, in the volatile memory 1214, in the non-volatile memory 1216, and/or on a removable non-transitory computer readable storage medium such as a CD or DVD.

Figure 13:
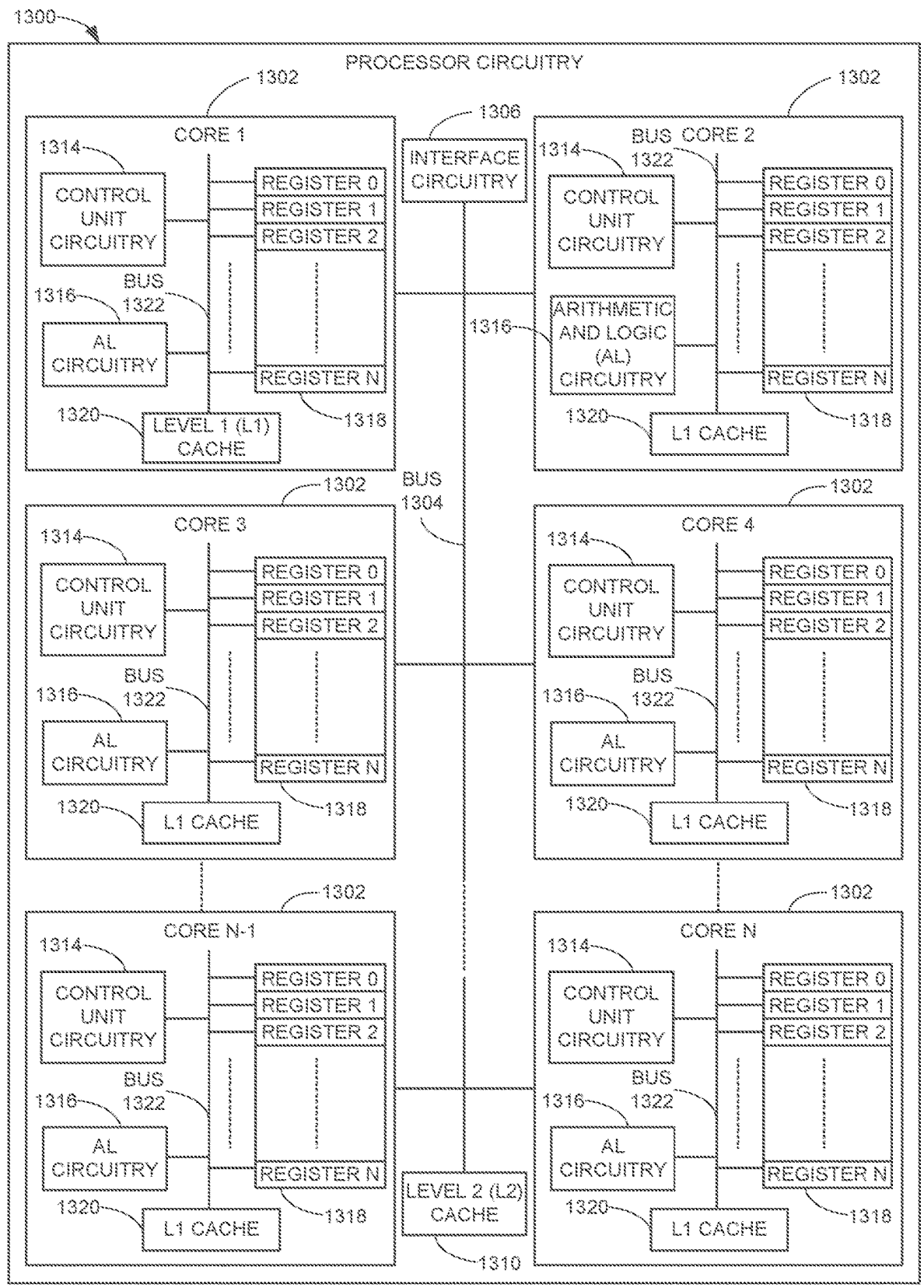
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a microprocessor 1300. For example, the microprocessor 1300 may be a general purpose microprocessor (e.g., general purpose microprocessor circuitry). The microprocessor 1300 executes some or all of the machine readable instructions of the flowchart of FIGS. 9-11 to effectively instantiate the circuitry of FIG. 2 as logic circuits to perform the operations corresponding to those machine readable instructions. In some such examples, the circuitry of FIG. 2 is instantiated by the hardware circuits of the microprocessor 1300 in combination with the instructions. For example, the microprocessor 1300 may be implemented by multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowchart of FIGS. 9-11.

The cores 1302 may communicate by a first example bus 1304. In some examples, the first bus 1304 may be implemented by a communication bus to effectuate communication associated with one(s) of the cores 1302. For example, the first bus 1304 may be implemented by at least one of an Inter-Integrated Circuit (I2C) bus, a Serial Peripheral Interface (SPI) bus, a PCI bus, or a PCIe bus. Additionally or alternatively, the first bus 1304 may be implemented by any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2 cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the local memory 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may be implemented by at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
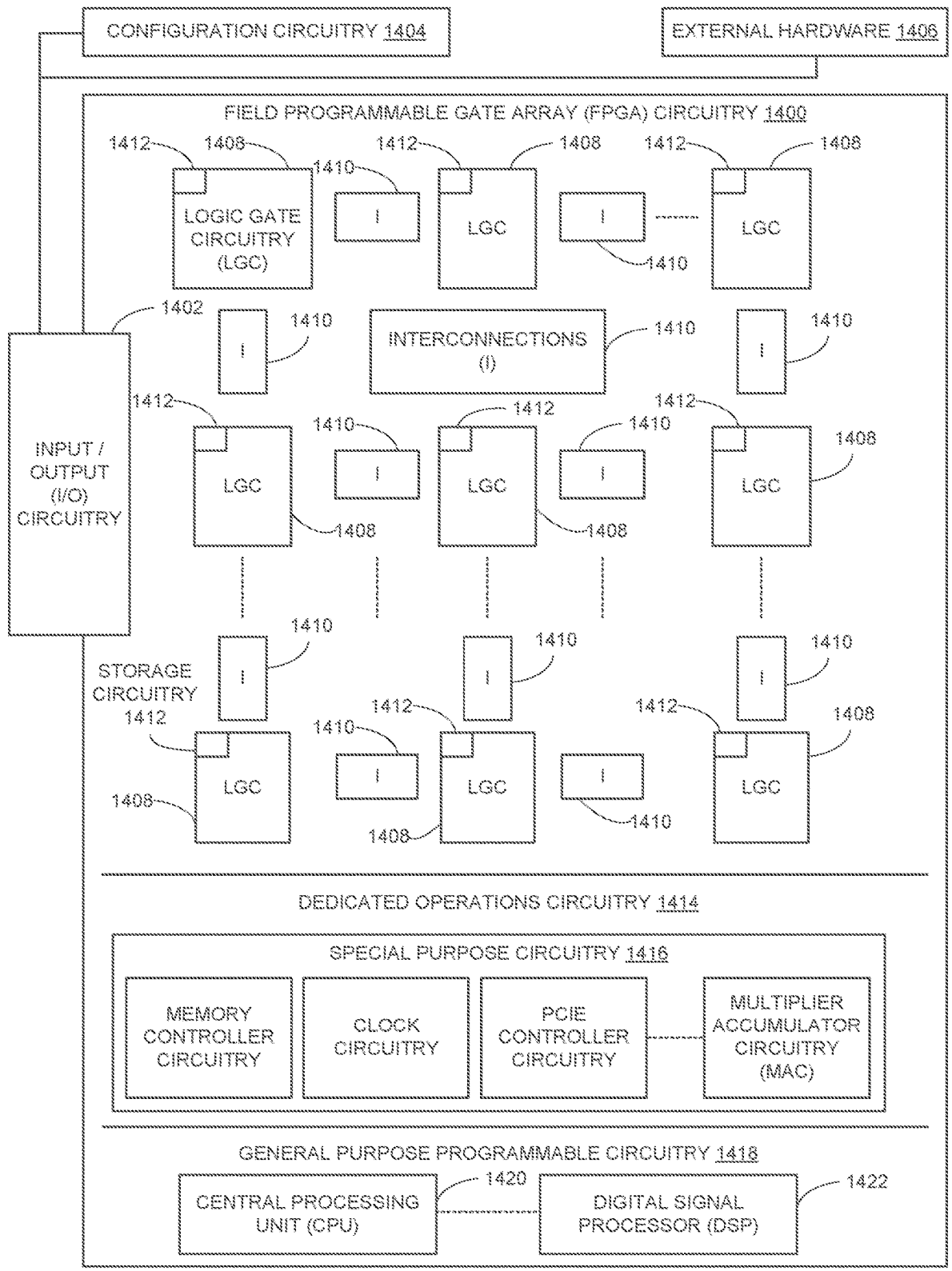
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. For example, the FPGA circuitry 1400 may be implemented by an FPGA. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowchart of FIGS. 9-11 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowchart of FIGS. 9-11. In particular, the FPGA circuitry 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowchart of FIGS. 9-11. As such, the FPGA circuitry 1400 may be structured to effectively instantiate some or all of the machine readable instructions of the flowchart of FIGS. 9-11 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 9-11 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware 1406. For example, the configuration circuitry 1404 may be implemented by interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may be implemented by external hardware circuitry. For example, the external hardware 1406 may be implemented by the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and the configurable interconnections 1410 are configurable to instantiate one or more operations that may correspond to at least some of the machine readable instructions of FIGS. 9-11 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The configurable interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an onboard CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowchart of FIGS. 9-11 may be executed by one or more of the cores 1302 of FIG. 13, a second portion of the machine readable instructions represented by the flowchart of FIGS. 9-11 may be executed by the FPGA circuitry 1400 of FIG. 14, and/or a third portion of the machine readable instructions represented by the flowchart of FIGS. 9-11 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1212 of FIG. 12 may be in one or more packages. For example, the microprocessor 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

Figure 15:
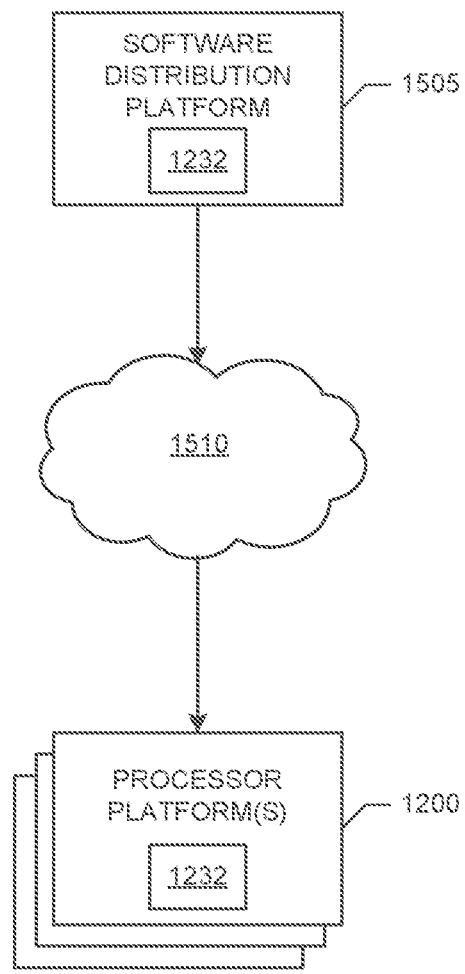
FIG. 15 is a block diagram of an example software distribution platform (e.g., one or more servers) to distribute software (e.g., software corresponding to the example machine readable instructions of FIGS. 9-11) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions 900 of FIGS. 9-11, as described above. The one or more servers of the example software distribution platform 1505 are in communication with an example network 1510, which may correspond to any one or more of the Internet and/or any of the example networks 1226 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions 900 of FIGS. 9-11, may be downloaded to the example processor platform 1200, which is to execute the machine readable instructions 1232. In some examples, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed that enable the automatic generation of one or more trends in a trend interface of a trend interface application based on the dragging and dropping of a graphical element from an operator interface of an operator interface application. The drag and drop operation is associated with drag data containing all relevant configuration parameters to generate such trends in an efficient manner. Furthermore, in some examples, the trend information is analyzed and cached in memory even before the graphical element is dropped to further improve efficiency. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to generate and display trends associated with a process control system are disclosed herein. Further examples and combinations thereof include the following:

Example 1 includes an apparatus comprising memory, machine readable instructions, and processor circuitry to execute the instructions to generate a first graphical user interface, the first graphical user interface to include a graphical representation of a component in a process control system, and generate a second graphical user interface, the second graphical user interface to include a chart region with a trend represented therein, the trend indicative of values of a process parameter of the process control system over a period of time, and automatically generate the trend in the chart region in response to a graphical element being dragged and dropped from the first graphical user interface to the second graphical user interface.

Example 2 includes the apparatus of example 1, wherein the process parameter is associated with an operation of the component.

Example 3 includes the apparatus of example 1, wherein the process parameter is unrelated to an operation of the component.

Example 4 includes the apparatus of example 1, wherein the processor circuitry is to cause storage of trend information associated with the parameter after the graphical element is dragged to the second graphical user interface and before the graphical element is dropped in the second graphical user interface, the trend to be generated based on the trend information.

Example 5 includes the apparatus of example 1, wherein the processor circuitry is to clear the stored trend information in response to the graphical element being dragged out of the second graphical user interface without being dropped in the second graphical user interface.

Example 6 includes the apparatus of example 1, wherein the trend is a first trend, and the processor circuitry is to automatically generate a second trend in the chart region in response to the graphical element being dragged from the first graphical user interface and dropped in the second graphical user interface.

Example 7 includes the apparatus of example 6, wherein the processor circuitry is to plot both the first and second trends using a single Y-axis scale.

Example 8 includes the apparatus of example 6, wherein the processor circuitry is to plot the first and second trends using separate Y-axis scales.

Example 9 includes the apparatus of example 1, wherein the trend is a first trend, the process parameter is a first process parameter, and the chart region includes a second trend associated with a second process parameter different than the first process parameter, the second trend included in the chart region before the graphical element is dragged from the first graphical user interface, the processor circuitry to compare a first Y-axis scale designated for the first trend to a second Y-axis scale in the chart region used for the second trend, plot the first trend in the chart region using the second Y-axis scale when a difference between the first Y-axis scale and the second Y-axis scale satisfies a threshold, and add the first Y-axis scale to the chart region and plot the first trend in the chart region using the first Y-axis scale when the difference between the first Y-axis scale and the second Y-axis scale does not satisfy the threshold.

Example 10 includes the apparatus of example 1, wherein the trend is a first trend, and the processor circuitry is to divide the chart region into different chart segments, the first trend to be plotted within one of the different chart segments, and automatically set a height for each of the different chart segments to fill a space associated with the chart region.

Example 11 includes a non-transitory machine readable storage medium comprising instructions that, when executed, cause processor circuitry to at least generate a first graphical user interface, the first graphical user interface to include a graphical representation of a component in a process control system, and generate a second graphical user interface, the second graphical user interface to include a chart region with a trend represented therein, the trend indicative of values of a process parameter of the process control system over a period of time, and automatically generate the trend in the chart region in response to a graphical element being dragged and dropped from the first graphical user interface to the second graphical user interface.

Example 12 includes the non-transitory machine readable storage medium of example 11, wherein the instructions cause the processor circuitry to cause storage of trend information associated with the parameter after the graphical element is dragged to the second graphical user interface and before the graphical element is dropped in the second graphical user interface, the trend to be generated based on the trend information.

Example 13 includes the non-transitory machine readable storage medium of example 11, wherein the instructions cause the processor circuitry to clear the stored trend information in response to the graphical element being dragged out of the second graphical user interface without being dropped in the second graphical user interface.

Example 14 includes the non-transitory machine readable storage medium of example 11, wherein the trend is a first trend, and the instructions cause the processor circuitry to automatically generate a second trend in the chart region in response to the graphical element being dragged from the first graphical user interface and dropped in the second graphical user interface.

Example 15 includes the non-transitory machine readable storage medium of example 11, wherein the trend is a first trend, the process parameter is a first process parameter, and the chart region includes a second trend associated with a second process parameter different than the first process parameter, the second trend included in the chart region before the graphical element is dragged from the first graphical user interface, the instructions to cause the processor circuitry to compare a first Y-axis scale designated for the first trend to a second Y-axis scale in the chart region used for the second trend, plot the first trend in the chart region using the second Y-axis scale when a difference between the first Y-axis scale and the second Y-axis scale satisfies a threshold, and add the first Y-axis scale to the chart region and plot the first trend in the chart region using the first Y-axis scale when the difference between the first Y-axis scale and the second Y-axis scale does not satisfy the threshold.

Example 16 includes the non-transitory machine readable storage medium of example 11, wherein the trend is a first trend, and the instructions cause the processor circuitry to divide the chart region into different chart segments, the first trend to be plotted within one of the different chart segments, and automatically set a height for each of the different chart segments to fill a space associated with the chart region.

Example 17 includes a method comprising generating a first graphical user interface, the first graphical user interface to include a graphical representation of a component in a process control system, and generating a second graphical user interface, the second graphical user interface to include a chart region with a trend represented therein, the trend indicative of values of a process parameter of the process control system over a period of time, and automatically generating, by executing an instruction with at least one processor, the trend in the chart region in response to a graphical element being dragged and dropped from the first graphical user interface to the second graphical user interface.

Example 18 includes the method of example 17, wherein the trend is a first trend, the method further including automatically generating a second trend in the chart region in response to the graphical element being dragged from the first graphical user interface and dropped in the second graphical user interface.

Example 19 includes the method of example 17, wherein the trend is a first trend, the process parameter is a first process parameter, and the chart region includes a second trend associated with a second process parameter different than the first process parameter, the second trend included in the chart region before the graphical element is dragged from the first graphical user interface, the method further including comparing a first Y-axis scale designated for the first trend to a second Y-axis scale in the chart region used for the second trend, plotting the first trend in the chart region using the second Y-axis scale when a difference between the first Y-axis scale and the second Y-axis scale satisfies a threshold, and adding the first Y-axis scale to the chart region and plot the first trend in the chart region using the first Y-axis scale when the difference between the first Y-axis scale and the second Y-axis scale does not satisfy the threshold.

Example 20 includes the method of example 17, wherein the trend is a first trend, the method further including dividing the chart region into different chart segments, the first trend to be plotted within one of the different chart segments, and automatically setting a height for each of the different chart segments to fill a space associated with the chart region.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   memory;
   machine readable instructions; and
   processor circuitry to execute the instructions to:
   generate a first graphical user interface, the first graphical user interface to include a graphical representation of a component in a process control system;
   generate a second graphical user interface, the second graphical user interface to include a chart region with a first trend and a second trend represented therein, the first trend indicative of values of a first process parameter of the process control system over a period of time, the second trend indicative of values of a second process parameter of the process control system, the second process parameter different than the first process parameter; and
   automatically generate the first trend in the chart region in response to a graphical element being dragged and dropped from the first graphical user interface to the second graphical user interface, the second trend included in the chart region before the graphical element is dragged from the first graphical user interface, the generation of the first trend including:
   comparing a first Y-axis scale designated for the first trend to a second Y-axis scale in the chart region used for the second trend;
   plotting the first trend in the chart region using the second Y-axis scale when a difference between the first Y-axis scale and the second Y-axis scale satisfies a threshold; and
   adding the first Y-axis scale to the chart region and plotting the first trend in the chart region using the first Y-axis scale when the difference between the first Y-axis scale and the second Y-axis scale does not satisfy the threshold, the second Y-axis scale to be retained in the chart region when the first Y-axis scale is added.

2. The apparatus of claim 1, wherein the first process parameter is associated with an operation of the component.

3. The apparatus of claim 1, wherein the first process parameter is unrelated to an operation of the component.

4. The apparatus of claim 1, wherein the processor circuitry is to cause storage of trend information associated with the first process parameter after the graphical element is dragged to the second graphical user interface and before the graphical element is dropped in the second graphical user interface, the first trend to be generated based on the trend information.

5. The apparatus of claim 4, wherein the processor circuitry is to clear the stored trend information in response to the graphical element being dragged out of the second graphical user interface without being dropped in the second graphical user interface.

6. The apparatus of claim 1, wherein the processor circuitry is to automatically generate a third trend in the chart region in response to the graphical element being dragged from the first graphical user interface and dropped in the second graphical user interface.

7. The apparatus of claim 6, wherein the processor circuitry is to plot both the first and third trends using a single Y-axis scale.

8. The apparatus of claim 6, wherein the processor circuitry is to plot the first and third trends using separate Y-axis scales.

9. The apparatus of claim 1, wherein the processor circuitry is to:
   divide the chart region into different chart segments, the first trend to be plotted within one of the different chart segments; and
   automatically set a height for each of the different chart segments to fill a space associated with the chart region.

10. The apparatus of claim 9, wherein the different chart segments are to be vertically stacked above one another.

11. The apparatus of claim 9, wherein a first height of a first one of the different chart segments is different than a second height of a second one of the different chart segments.

12. The apparatus of claim 1, wherein both the first and second trends are to be plotted using an X-axis scale, both the first and second Y-axis scales positioned adjacent a same end of the X-axis scale.

13. The apparatus of claim 1, wherein the first Y-axis scale is associated with a first upper limit and a first lower limit, and the second Y-axis scale is associated with a second upper limit and a second lower limit, the first upper limit to be adjacent to and at a same height as the second upper limit, the first lower limit to be adjacent to and at a same height as the second lower limit.

14. The apparatus of claim 1, wherein the first graphical user interface is to be contained in a first window associated with a first application, and the second graphical user interface is to be contained in a second window associated with a second application, the first window different than the second window, the first application different than the second application.

15. A non-transitory machine readable storage medium comprising instructions that, when executed, cause processor circuitry to at least:
   generate a first graphical user interface, the first graphical user interface to include a graphical representation of a component in a process control system;
   generate a second graphical user interface, the second graphical user interface to include a chart region with a first trend and a second trend represented therein, the first trend indicative of values of a first process parameter of the process control system over a period of time, the second trend indicative of values of a second process parameter of the process control system, the second process parameter different than the first process parameter; and
   automatically generate the first trend in the chart region in response to a graphical element being dragged and dropped from the first graphical user interface to the second graphical user interface, the second trend included in the chart region before the graphical element is dragged from the first graphical user interface, the generation of the first trend including:
      comparing a first Y-axis scale designated for the first trend to a second Y-axis scale in the chart region used for the second trend;
      plotting the first trend in the chart region using the second Y-axis scale when a difference between the first Y-axis scale and the second Y-axis scale satisfies a threshold; and
      adding the first Y-axis scale to the chart region and plotting the first trend in the chart region using the first Y-axis scale when the difference between the first Y-axis scale and the second Y-axis scale does not satisfy the threshold, the second Y-axis scale to be retained in the chart region when the first Y-axis scale is added.

16. The non-transitory machine readable storage medium of claim 15, wherein the instructions cause the processor circuitry to cause storage of trend information associated with the first process parameter after the graphical element is dragged to the second graphical user interface and before the graphical element is dropped in the second graphical user interface, the first trend to be generated based on the trend information.

17. The non-transitory machine readable storage medium of claim 16, wherein the instructions cause the processor circuitry to clear the stored trend information in response to the graphical element being dragged out of the second graphical user interface without being dropped in the second graphical user interface.

18. The non-transitory machine readable storage medium of claim 15, wherein the instructions cause the processor circuitry to automatically generate a third trend in the chart region in response to the graphical element being dragged from the first graphical user interface and dropped in the second graphical user interface.

19. The non-transitory machine readable storage medium of claim 15, wherein the instructions cause the processor circuitry to:
   divide the chart region into different chart segments, the first trend to be plotted within one of the different chart segments; and
   automatically set a height for each of the different chart segments to fill a space associated with the chart region.

20. A method comprising:
   generating a first graphical user interface, the first graphical user interface to include a graphical representation of a component in a process control system;
   generating a second graphical user interface, the second graphical user interface to include a chart region with a first trend and a second trend represented therein, the first trend indicative of values of a first process parameter of the process control system over a period of time, the second trend indicative of values of a second process parameter of the process control system, the second process parameter different than the first process parameter; and
   automatically generating, by executing an instruction with at least one processor, the first trend in the chart region in response to a graphical element being dragged and dropped from the first graphical user interface to the second graphical user interface, the second trend included in the chart region before the graphical element is dragged from the first graphical user interface, the generation of the first trend including:
      comparing a first Y-axis scale designated for the first trend to a second Y-axis scale in the chart region used for the second trend;
      plotting the first trend in the chart region using the second Y-axis scale when a difference between the first Y-axis scale and the second Y-axis scale satisfies a threshold; and
      adding the first Y-axis scale to the chart region and plotting the first trend in the chart region using the first Y-axis scale when the difference between the first Y-axis scale and the second Y-axis scale does not satisfy the threshold, the second Y-axis scale to be retained in the chart region when the first Y-axis scale is added.

21. The method of claim 20, further including automatically generating a third trend in the chart region in response to the graphical element being dragged from the first graphical user interface and dropped in the second graphical user interface.

22. The method of claim 20, further including:
   dividing the chart region into different chart segments, the first trend to be plotted within one of the different chart segments; and
   automatically setting a height for each of the different chart segments to fill a space associated with the chart region.

* * * * *